United States Patent [19]
Zittel et al.

[11] Patent Number: 5,780,088
[45] Date of Patent: Jul. 14, 1998

[54] ELECTRIC MOTOR DRIVEN ABRASIVE ROLLER PEELER AND CLEANING MACHINE

[75] Inventors: David R. Zittel, 155 Oak Grove Dr., Columbus, Wis. 53925; Steven B. Malchow, Lake Mills, Wis.

[73] Assignee: David R. Zittel, Columbus, Wis.

[21] Appl. No.: 785,746

[22] Filed: Jan. 17, 1997

[51] Int. Cl.$^6$ .................................. A23N 7/00; A23N 7/02
[52] U.S. Cl. ................... 426/483; 99/516; 99/623; 99/626; 99/629; 426/481
[58] Field of Search .................... 99/516, 518, 519, 99/623–626, 627–630, 540, 539; 15/3.2, 3.19; 426/481–483; 134/132

[56] References Cited

U.S. PATENT DOCUMENTS

| | | | |
|---|---|---|---|
| 3,946,658 | 3/1976 | Smith | 99/627 |
| 4,068,574 | 1/1978 | Amstad | 99/587 |
| 4,132,162 | 1/1979 | Magnuson | 99/630 |
| 4,145,647 | 3/1979 | Nielsen et al. | 318/810 |
| 4,189,962 | 2/1980 | Chung | 74/802 |
| 4,217,788 | 8/1980 | Burr et al. | 74/425 |
| 4,229,991 | 10/1980 | Douglas et al. | 74/409 |
| 4,230,034 | 10/1980 | Amstad | 99/587 |
| 4,237,782 | 12/1980 | Bichel | 99/625 |
| 4,281,560 | 8/1981 | Herscovici | 74/414 |
| 4,417,485 | 11/1983 | Boor | 74/785 |
| 4,442,394 | 4/1984 | Beierholm et al. | 318/807 |
| 4,519,305 | 5/1985 | Vanosdall | 99/625 |
| 4,697,508 | 10/1987 | Tallafus | 99/534 X |
| 4,710,389 | 12/1987 | Dornow | 426/231 |
| 4,730,554 | 3/1988 | Kristiaan | 99/546 |

(List continued on next page.)

OTHER PUBLICATIONS

Color photocopies of photographs 1–4 of Lyco stationary U–bed peeling and cleaning machine having its abrasive rollers/brushes driven by electric motors coupled by belts to the rollers/brushes, undated.

Color photocopies of photographs 10–12 of Lyco stationary U–bed peeling and cleaning machine having its abrasive rollers/brushes driven by hydraulic motors directly coupled to each roller/brush, undated.

Lyco brochure entitled "'mini' Peelers/Washers" depicting electric motor belt driven rotation abrasive roller/brush peeling and cleaning machine. (date unknown) 1 double sided page, undated.

Magnuson Corporation "MagnuScrubber and Magnu-Washer" brochure, 5 pages; date unknown.

VanMark Corporation brochure entitled "Two New Drive Conversion Kits For VanMark Model 26 Peeler"; 2 pages; date unknown.

(List continued on next page.)

*Primary Examiner*—Timothy F. Simone
*Attorney, Agent, or Firm*—Nilles & Nilles, S.C.

[57] ABSTRACT

A machine for peeling and cleaning fruits and vegetables using a plurality of rotating abrasive rollers which are each driven by an electric motor. The machine has a frame with a pair of end plates that rotatively carry the rollers. Each motor is carried by an end plate and coupled to a roller solely to drive only that roller. In one preferred embodiment, the motor is coupled to a gear reducer that preferably is a cycloidal gear reducer having an output shaft coupled to one end of a roller and which has an output shaft axis of rotation generally coaxial with the axis of rotation of the roller. In another preferred embodiment, the motor can be directly coupled to the roller with its output shaft axis of rotation generally coaxial with the roller axis of rotation. To control operation and speed of the abrasive rollers, the motors are controlled by a motor controller that preferably is a variable frequency electric motor drive. Where the machine uses an auger to urge food product through the machine, the auger can be driven by an electric motor whose operation and speed preferably is controlled by a variable frequency electric motor drive. Where the machine is a rotating cage machine, the cage can be driven by an electric motor whose operation and speed preferably is controlled by a variable frequency electric motor drive. Each motor preferably is a three phase alternating current electric motor.

73 Claims, 14 Drawing Sheets

U.S. PATENT DOCUMENTS

| | | | |
|---|---|---|---|
| 4,804,817 | 2/1989 | Overbay | 219/136 |
| 4,827,836 | 5/1989 | Neidigh | 99/625 |
| 4,953,223 | 8/1990 | Householder | 381/188 |
| 5,033,372 | 7/1991 | Silvestrini | 99/625 |
| 5,079,754 | 1/1992 | Huang | 368/322 |
| 5,093,771 | 3/1992 | Harvest | 363/98 |
| 5,106,641 | 4/1992 | Bichel | 426/483 |
| 5,168,802 | 12/1992 | Silvestrini et al. | 99/587 |
| 5,186,068 | 2/1993 | Heller | 74/425 |
| 5,239,881 | 8/1993 | Chiba et al. | 74/421 |
| 5,245,919 | 9/1993 | Neidigh | 99/623 |
| 5,279,174 | 1/1994 | Minegishi | 74/458 |
| 5,307,738 | 5/1994 | Amstad | 99/625 |
| 5,329,845 | 7/1994 | Bichel | 99/627 |
| 5,351,610 | 10/1994 | Jönsson | 99/628 |
| 5,385,074 | 1/1995 | Burch, Jr. | 99/538 X |
| 5,398,904 | 3/1995 | Rees | 248/429 |
| 5,401,220 | 3/1995 | Heller | 475/180 |
| 5,484,345 | 1/1996 | Fukaya | 475/162 |
| 5,497,041 | 3/1996 | Kondoh et al. | 310/156 |
| 5,523,638 | 6/1996 | Albrecht et al. | 310/219 |
| 5,574,664 | 11/1996 | Feasey | 364/571.07 |

OTHER PUBLICATIONS

Hawkeye Food Machinery, Inc., Model #2003 Peeler/Washer Service Manual (15 H.P.), 26 pages, undated.

Sumitomo Machinery Corp. of America "SM–Cyclo Speed Reducers & Gear Motors" catalog No. 04.301.50.007; pp. 1–5, 116, and 152, undated.

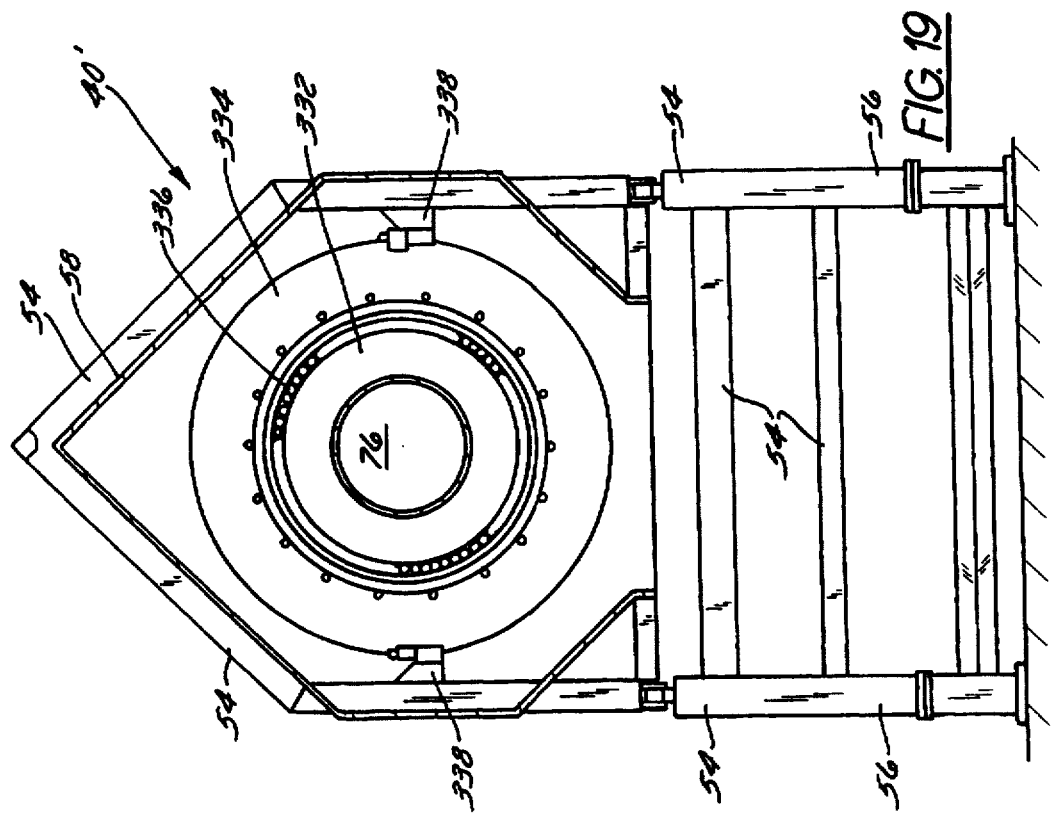
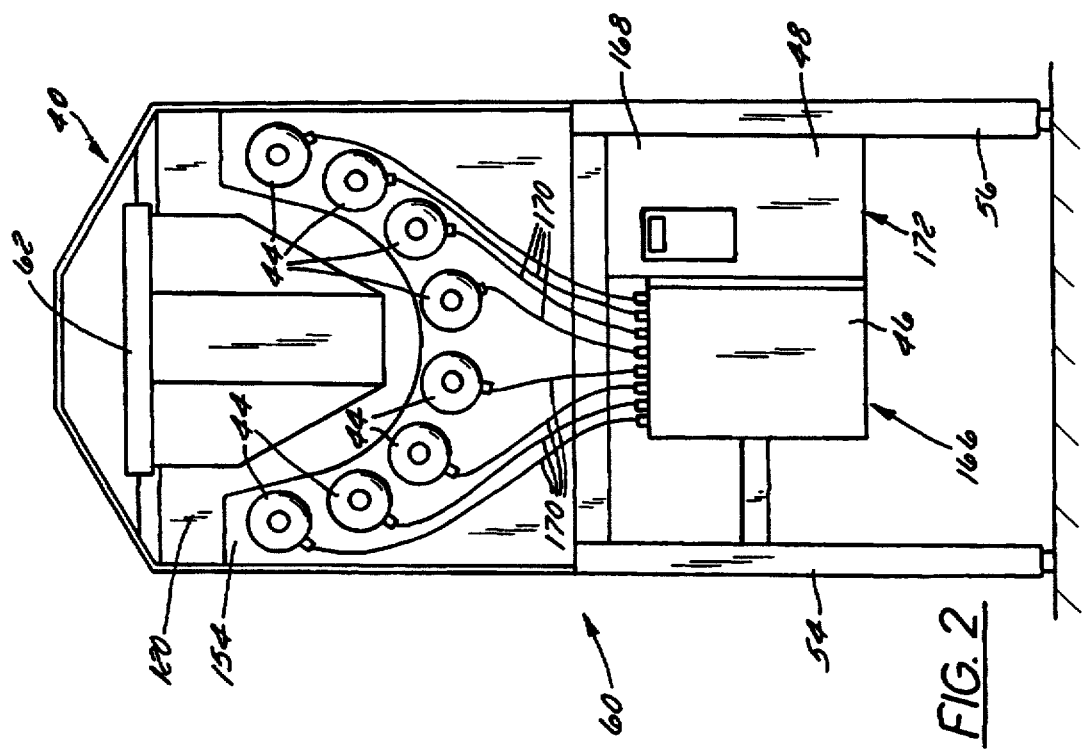

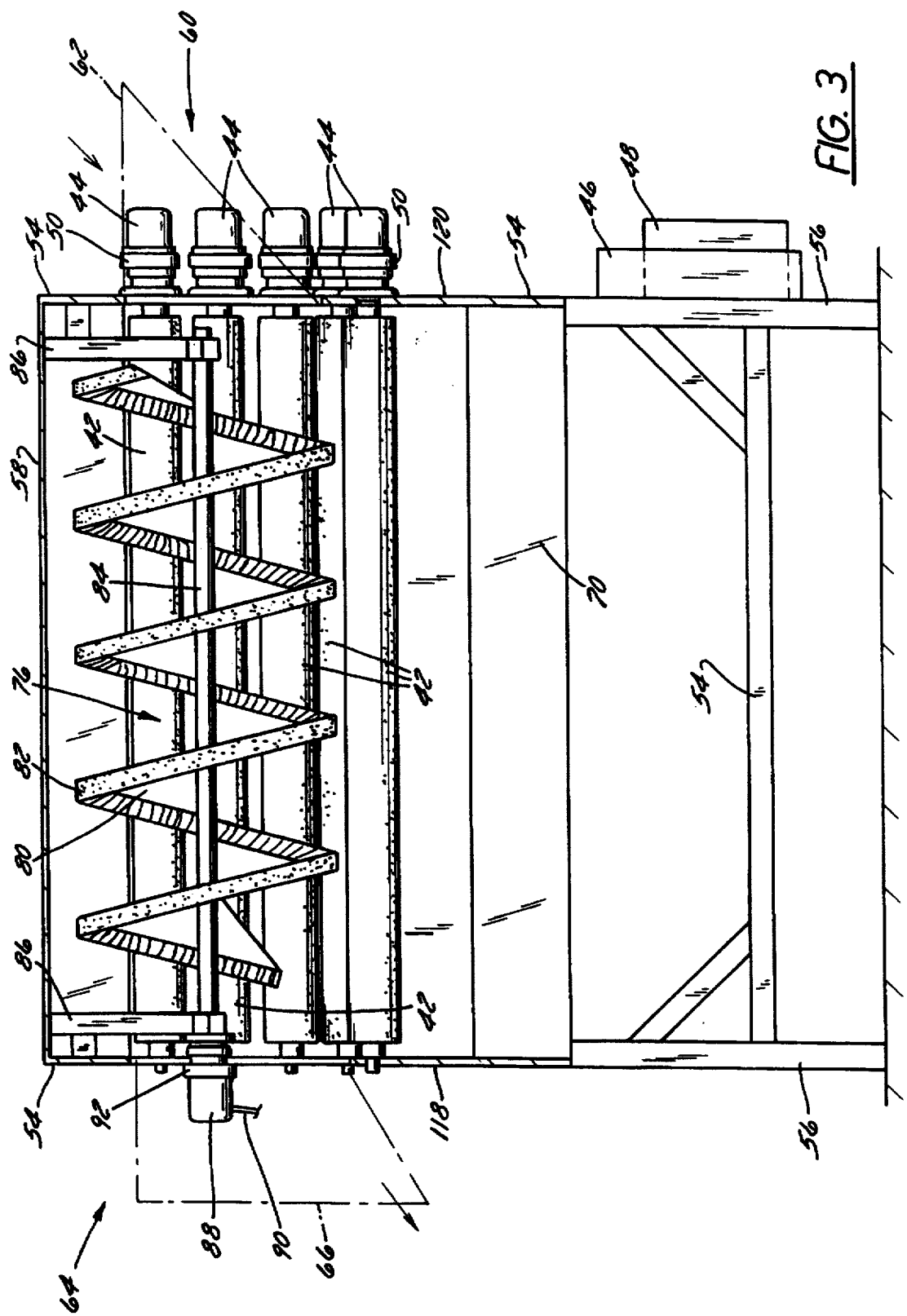

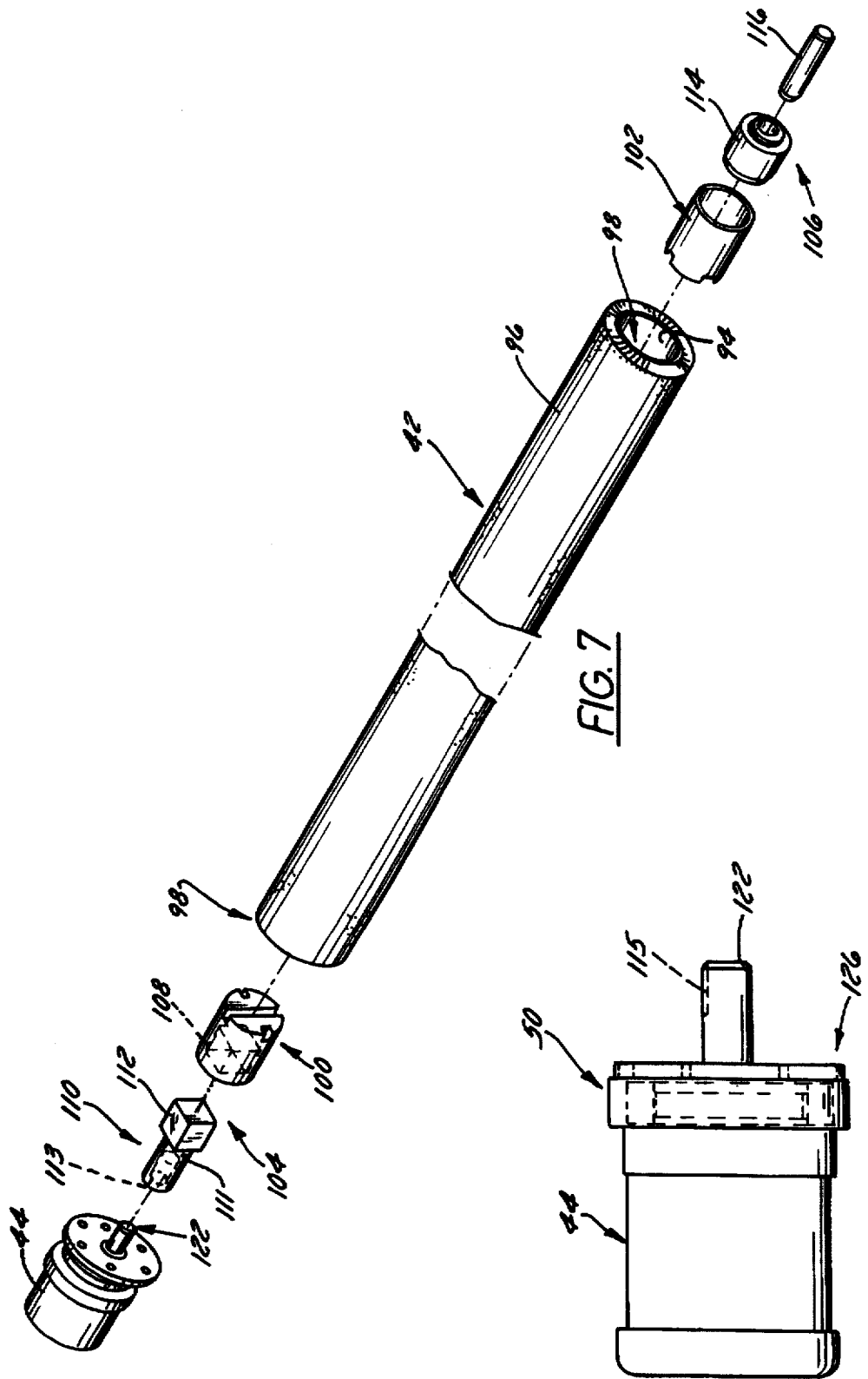

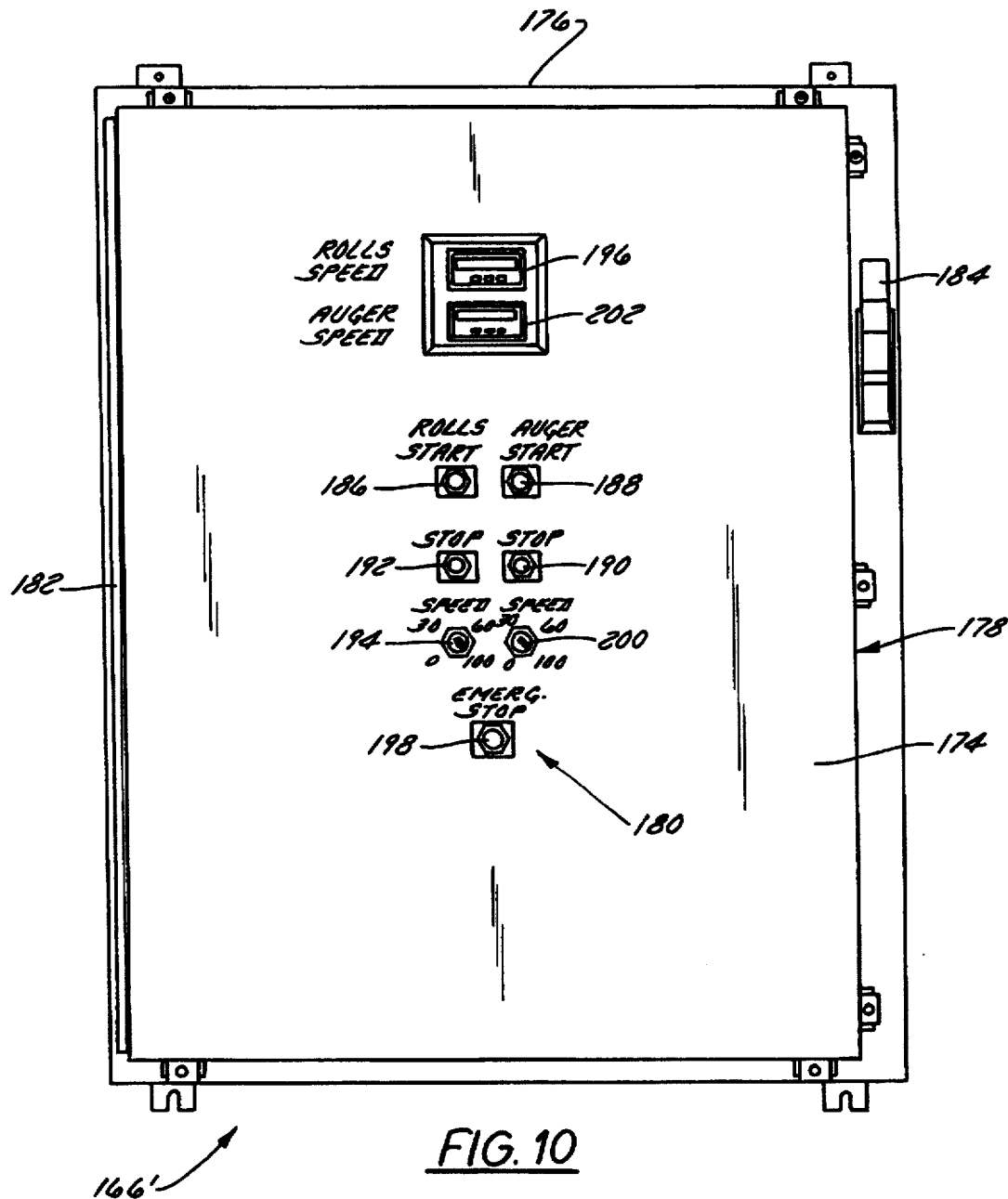

ELECTRIC MOTOR DRIVEN ABRASIVE ROLLER PEELER AND CLEANING MACHINE

FIELD OF THE INVENTION

The present invention relates to industrial food processing equipment in general and more particularly to abrasive roller peelers and cleaners.

BACKGROUND OF THE INVENTION

In the peeling and cleaning of food products that are typically vegetables and fruits, food processing machines utilizing rotating rollers that abrade the food product to peel, clean or wash the food product are commonly used. Each abrasive roller peeling and cleaning machine utilizes several abrasive elongate rollers grouped in a circle or semicircle to form a chamber for receiving the food product. Each machine also includes a drive system for rotating each roller. Abrasive roller peeling and cleaning machines are favored and have enjoyed considerable commercial success because they are versatile and use little, if any, water during operation minimizing post-processing water treatment costs.

During operation, each of the rollers of an abrasive roller food processing machine are rotated about a central longitudinal axis and food product entering the machine engages one or more of the rotating rollers. While in contact with a roller, the roller contacts and at least slightly abrades the food product. Each roller typically comprises a central core that has brush bristles which extend radially outwardly from the core which engage food product to wash or abrasively clean, peel, or clean and peel the food product. Other commonly used roller configurations include a roller having an exterior made of a relatively rough sandpaper-like material and a roller having a plurality of slightly axially spaced apart circular flexible rubber or plastic fins (flanges) or fingers carried by the roller core.

When cleaning food product, the rotating rollers abrade the food product to remove dirt and other residue on the food product to prepare the food product to be further processed or to enable the cleaned food product to be packaged and shipped to market. When peeling food product, the rotating rollers abrade the exterior of the food product typically to remove its skin thereby also washing or cleaning the food product. In some instances, while either cleaning or peeling food product, some water or another solvent can be introduced in the food product receiving chamber of the machine along with the food product.

In one type of abrasive roller peeling and cleaning machine, the machine comprises a frame with a pair of generally upstanding and spaced apart endplates that carry the rollers between them. The rollers are journalled for rotation in the end plates, both end plates remaining stationary during operation. Generally, the rollers are arranged in an upturned U-shaped semicircle (stationary U-bed) with very little space between each pair of adjacent rollers to prevent food product from passing between adjacent roller pairs and falling downwardly. To enable food product to flow from an inlet end to an outlet end of the machine, a rotating auger between the rollers urges food product axially relative to the rollers from the inlet toward the outlet.

In another type of abrasive roller peeling and cleaning machine, the abrasive rollers are arranged to form a cylindrical food product receiving chamber and are each journalled for rotation in the end plates which in turn are rotatably carried by the frame. More particularly, the rollers, struts and end plates form a cage that is rotated in addition to each abrasive roller being rotated. To enable food product to flow from the inlet to the outlet of the machine, the machine can be tilted downwardly in the desired direction of product flow or an auger can be received in the chamber with relative rotation between the cage and auger causing food product to be urged by the auger from the inlet end toward the outlet end of the machine.

To rotate the abrasive rollers, several types of drive mechanisms or drive systems are used. In one commonly used drive mechanism, the rollers are interconnected by belts with one of the rollers being connected to an electric or hydraulic motor by another belt. These belts simply transfer power between the rollers and transfer power from the motor to the rollers. The belts do not function as a gear reducing mechanism and therefore do not reduce the output speed of the motor to enable the rollers to handle more torque caused by a greater load on one or more of the rollers.

This relatively complicated drive mechanism is costly in construction and in maintenance. One known disadvantage to this type of drive mechanism is that all of the belt interconnected rollers driven by a motor must all be driven at the same speed as the motor and cannot be varied in speed relative to another belt interconnected roller. Another known disadvantage to the belt drive mechanism is that belt wear during use can require time consuming and costly machine shutdowns to replace one or more worn belts. As a result of belt wear, one or more of the rollers can rotate at a speed less than the desired rotational speed which can result in incomplete peeling or cleaning of food product or which can cause the food product to have to remain longer in the chamber than desired to achieve the desired peeling or cleaning. Finally, these systems are bulky and use many moving parts, each of which decreases reliability while increasing maintenance.

In another kind of drive mechanism, each roller is driven by a hydraulic motor that is supplied with hydraulic fluid under pressure from a hydraulic pump. The motor is attached to an endplate of the peeling and cleaning machine and has an output shaft coupled to an abrasive roller. In a known U-bed stationary abrasive roller peeling and cleaning machine manufactured by Lyco Manufacturing Inc., 115 Commercial Drive, Columbus, Wis. 53925, the machine has two banks of rollers with the rollers of a given bank driven at the same speed and the roller speed and direction of one bank being variable relative to the roller speed and direction of the other bank. It is believed, and heretofore not known otherwise, that all of the rollers of a bank of rollers of the machine are driven at exactly the same speed by the pump and motors because the motors are supplied in series with hydraulic fluid from the pump and fluid pressure losses downstream can cause downstream motors to run more slowly.

Unfortunately, without resort to relatively expensive hydraulic fluid throttling valves for each hydraulic motor, the speed of one roller in a bank cannot be selectively varied relative to another roller of the bank thereby at least somewhat limiting the versatility of the machine. Additionally, hydraulic drive systems are quite complicated and expensive to manufacture and can have reliability problems if hoses break or internal motor seals leak.

Another difficulty with hydraulic drive systems is that the hydraulic motor seals currently in use cannot typically withstand hydraulic fluid pressures of greater than about 1000 p.s.i. However, in many instances, to power in series as many as four or more rollers of a bank of rollers, an input pressure of as much as 1500 p.s.i. or greater is needed. To remedy this problem and prevent premature seal blowout, a flow divider is typically used. Unfortunately, using a flow divider results in pressure losses of as much as 150 p.s.i. or more in addition to pressure losses after each motor. All of these pressure losses accumulate resulting in a great deal of energy wasted as well as the rollers further downstream typically operating at a speed slightly slower than the speed of the upstream rolls.

In rotating cage type abrasive roller peeling and cleaning machines, either the inlet or outlet of the machine carries a hub that is driven through a belt by a motor that typically is an electric or hydraulic motor to cause the cage to rotate about a longitudinal axis of the cage. As the cage rotates, a ring-shaped stationary gear carried by the frame has inwardly extending teeth that engage a tooth of a gear at the end of each roller to drive the roller as the roller gears orbit interiorly the stationary gear. An example of this type of drive arrangement is found in U.S. Pat. No. 5,245,919.

This type of drive arrangement is rather elaborate and complicated because it uses so many moving parts to transfer rotary motion of the cage to each of the abrasive rollers. This complexity adds expense and increased maintenance. In addition to being more complicated and costly, this type of drive arrangement is limited because each of the drive rollers are driven by a single stationary gear as the cage rotates causing them all to rotate at about the same speed. As a result of being driven by a single stationary gear, none of the abrasive rollers can rotate at a different speed relative to any other roller. Moreover, the speed of all of the rollers is ultimately dependent upon the speed of rotation of the cage further limiting machine and processing flexibility.

What is needed is a drive system for an abrasive roller peeling and cleaning machine that enables each of the abrasive rollers to be driven independently of every other roller of the machine so that the speed of the rollers can be controlled and precisely varied. What is also needed is a more efficient abrasive roller drive system that provides more complete control over the entire peeling and cleaning process. What is further needed is a drive system for a rotating cage peeling and cleaning machine where the abrasive rollers are driven independently of the cage and auger. What is still further needed is a drive system for a rotating cage peeling and cleaning machine that enables the roller to be driven independently of the cage and independently of each other. What is also needed is a drive and control system for a peeling and cleaning machine that is more compact, more reliable, simpler and cheaper to manufacture and operate.

SUMMARY OF THE INVENTION

A peeling and cleaning machine for washing, cleaning or peeling fruits and vegetables that has a plurality of abrasive rollers that rotate during operation to engage and at least slightly abrade food product that comes into contact with one or more of the rollers to wash, clean or peel the food product. The rollers are rotatively carried by a spaced apart pair of end plates that form part of the peeling and cleaning machine frame. The rollers are mounted to the end plates such that at least a portion of the rollers define a generally semicircular food product receiving chamber that has an inlet and an outlet. In a rotating cage peeling and cleaning machine, the rollers and endplates form a rotatable cage and an elongate generally cylindrical food product receiving chamber.

Each roller is driven by its own electric motor thereby advantageously simplifying the roller drive mechanism while also making it more compact and reliable. Each abrasive roller drive motor preferably is an alternating current electric motor that preferably is of three phase construction. If desired, the motor can be of direct current construction or of 120 volt AC construction. If the roller is directly driven only by the motor, the output shaft of the motor preferably is substantially coaxial to the axis of rotation of the roller coupled to the motor output shaft.

Each motor is carried by one of the end plates and positioned such that its output shaft is adjacent one end of an abrasive roller so it can be easily coupled to the roller. Preferably, each motor is mounted to a motor mounting plate that is located outwardly of and adjacent to an end plate. Each motor is mounted to the mounting plate with its shaft extending through an opening in the plate toward an end of the abrasive roller. Preferably, the motor mounting plate is carried by or mounted to the frame of the machine and can be mounted to or carried by the end plate, if desired.

To provide a sufficient amount of torque to each of the rollers so that each roller can rotate despite being heavily under load, each motor is coupled to a gear reducer of relatively compact construction that is in turn coupled to one end of an abrasive roller. The output shaft of the gear reducer is coupled to the roller such that its axis of rotation is generally coaxial or coincident with the axis of rotation of the roller whether or not the motor output shaft is generally coaxial with the roller axis of rotation. Preferably, the gear reducer is a cycloidal-type gear reducer for providing heavy duty and reliable operation and which is capable of withstanding relatively large shocks such as what can be experienced during the peeling and cleaning of food product.

To control operation and speed of each of the abrasiver rollers, a motor control capable of controllably varying the rotational speed of each roller by controllably varying the rotational speed of each abrasive roller drive motor preferably is used. The motor control preferably is an inverter or a variable frequency electric motor drive. Such a motor drive is constructed and arranged to vary the rotational speed of each motor such that the rotational speed of each roller is between about 100 revolutions per minute (rpm) and about 600 rpm. Preferably, the abrasive roller motor and variable frequency speed drive can be selected to enable the abrasive roller to rotate at speeds as high as 900 rpm or higher, if desired.

Where it is desired to control the operation, speed and direction of one of the abrasive rollers relative to another of the abrasive rollers, more than one variable frequency drive can be used. For example, if it desired to rotate a bank of four rollers in one direction or at a certain speed and the remainder of the rollers forming a bank of rollers which rotate in another direction or at a different speed, two variable frequency drives are used with one drive in control of one bank and the other drive in control of the other bank. More than two variable frequency drives can be used to control the abrasive roller drive motors.

An auger comprised of a shaft rotatively carried by the peeling and cleaning machine frame has a continuous and generally helical auger flight that is carried by the shaft and which is rotated at one end by a motor can be used to urge food product through the product receiving chamber of the machine. If an auger is used to facilitate food product flow through the product receiving chamber, the auger shaft preferably is coupled to an electric motor that is controlled by a variable frequency drive. By this construction, the rotational speed of auger can be controlled to control how long food product remains inside the chamber of the machine thereby providing relatively precise control over the quality of clean or peel that is imparted to food product passing through the machine.

Preferably, the auger drive motor is coupled to the auger shaft by a gear reducer that can be a conventional helical gear gear reducer or which can be a cycloidal gear reducer. If coupled to the shaft by a gear reducer, the gear reducer can be a generally right-angled gear reducer.

For rotating cage peeling and cleaning machines having the abrasive rollers rotatively mounted to end plates which rotate all of the rollers about a common longitudinal axis of rotation during operation, the cage is rotated independently of the rotation of each individual abrasive roller. Preferably, the cage is driven by an electric motor that also can be controlled by an inverter or variable frequency drive for controlling the direction and speed of rotation of the cage during machine operation.

To communicate electrical power to each abrasive roller drive motor carried by an end plate, the rotating cage machine has a slip ring or commutator for enabling electrical power to be supplied to each of the abrasive roller drive motors while the roller drive motors rotate in unison along with the rest of the cage about the axis of rotation of the cage. If an auger is used, the commutator preferably is a pair of telescopically nested generally cylindrical and hollow cores which are both telescoped over a portion of the auger shaft.

Wires extend radially inwardly from each roller drive motor to the outer core of the commutator which communicates with brushes or contacts that encircle both the radially inner surface of the outer core and radially outer surface of the inner core to communicate power between the cores while the cores are rotating relative to each other. A motor power supply wire or lead extends from the inner core to a motor control unit that preferably includes one or more variable frequency drives and a power supply. The inner core rides on bearings on the auger shaft enabling it to rotate relative to the auger shaft and enabling the auger shaft to rotate relative to the commutator. The outer core rides on bearings on the inner core permitting relative rotation between the outer core and inner core.

In another type of commutator for transferring power to rotating abrasive roller drive motors, each motor has an axially outwardly extending contact wheel that rides along the radially inner surface of a stationary ring secured to the frame. Both the ring and contact wheel have brushes or contacts that bear against each other as the contact wheel of each motor rides along the ring receiving electrical power from the ring thereby powering each abrasive roller motor. Electrical power is supplied to the ring by the variable frequency drive or drives responsible for controlling abrasive roller motor operation.

It is an object of the present invention to provide a machine that uses elongate and generally cylindrical abrasive rollers, that can be brushes or grit covered rollers, which are each rotated by an electric motor to clean, wash or peel food products that come into contact with a roller.

It is an advantage of the present invention to provide a peeling and cleaning machine that drives the abrasive rollers using fewer moving parts for decreasing assembly costs, increasing reliability and lessening maintenance.

It is another advantage of the present invention in that the use of electric motors to drive each abrasive roller provides greater control over abrasive roller speeds and direction of rotation.

It is another object to provide a peeling and cleaning machine control system that is capable of rotating the auger independently of the abrasive rollers.

It is still another object to provide a peeling and cleaning machine control system that is capable of rotating the abrasive rollers independently of and separately from a rotating cage carrying the rollers.

It is yet another object to provide a peeling and cleaning machine control system that can be used both with stationary U-bed peeling and cleaning machines and rotating cage peeling and cleaning machines.

It is a feature of the present invention that the rotational speed of the abrasive rollers can be more widely varied and more precisely controlled than planetary gear, belt drive and hydraulic abrasive roller drive systems.

It is another feature of the present invention that the peeling and cleaning machine control system is versatile in that it can be adapted for use with peeling and cleaning machines which have an auger, do not have an auger, have a rotating cage, and which do not have a rotating cage.

Further objects, features, and advantages of the invention will be apparent from the following detailed description when taken in conjunction with the accompanying drawings.

BRIEF DESCRIPTION OF THE DRAWINGS

FIG. 2 is an end view of an inlet end of the peeling and cleaning machine illustrating electric motor drives driving each elongate abrasive food product peeling and cleaning roller;

FIG. 3 is a longitudinal sectional view of the stationary U-bed peeling and cleaning machine;

FIG. 7 is an exploded perspective view of an abrasive roller;

FIG. 8 is a side view of a single abrasive roller drive motor;

FIG. 10 depicts a control unit for controlling operation of the abrasive rollers and an auger that urges food product through the peeling and cleaning machine;

FIG. 19 is an end view of the rotating cage peeling and cleaning machine with parts missing to more clearly illustrate the bearing ring.

DETAILED DESCRIPTION OF THE INVENTION

Figure 9:
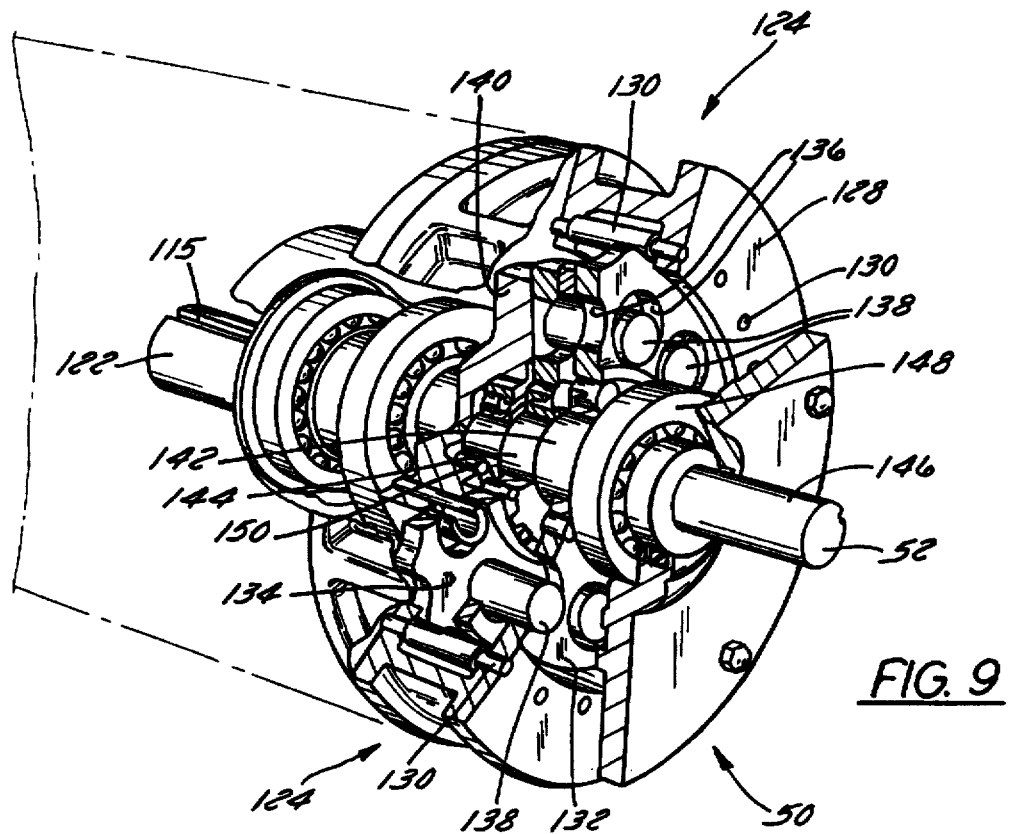
FIG. 9 is a fragmentary perspective view of a gear reducer of the motor with a portion of the gear reducer broken away to show various components of the gear reducer.

Referring more particularly to drawing FIGS. 1–4, wherein like numbers refer to similar parts, a food processing machine 40 for peeling and cleaning fruits and vegetables using one or more rotating abrasive rollers 42 is shown. Each abrasive roller 42 is driven by an electric motor 44 that is electrically connected to a drive motor control box 46 which controls motor operation and is electrically powered by a drive motor power supply 48. To help provide the necessary torque to each roller 42 so that the motor 44 will rotate the roller 42 even when the roller 42 is heavily loaded, the motor 44 can have and preferably is equipped with a gear reducer 50 in operable communication with its output shaft 52 (FIG. 9).

The peeling and cleaning machine 40 is carried by a frame 54 which is supported on legs 56. Enclosing the rollers is a housing 58 that is constructed of a hygienic, easy to clean material that can be stainless steel, nylon or the like. Below the housing 58 is a funnel-shaped collection pan 70 that collects the skin, juices, moisture, dirt and other residue that is produced during operation and which has an opening to direct this material into a collection basin 72 (shown in phantom in FIG. 4) below the pan 70. The collection basin 72 can be constructed with an outlet drain port 74 for enabling material that has collected in the basin 72 to be drained or purged from the basin 72.

Figure 1:
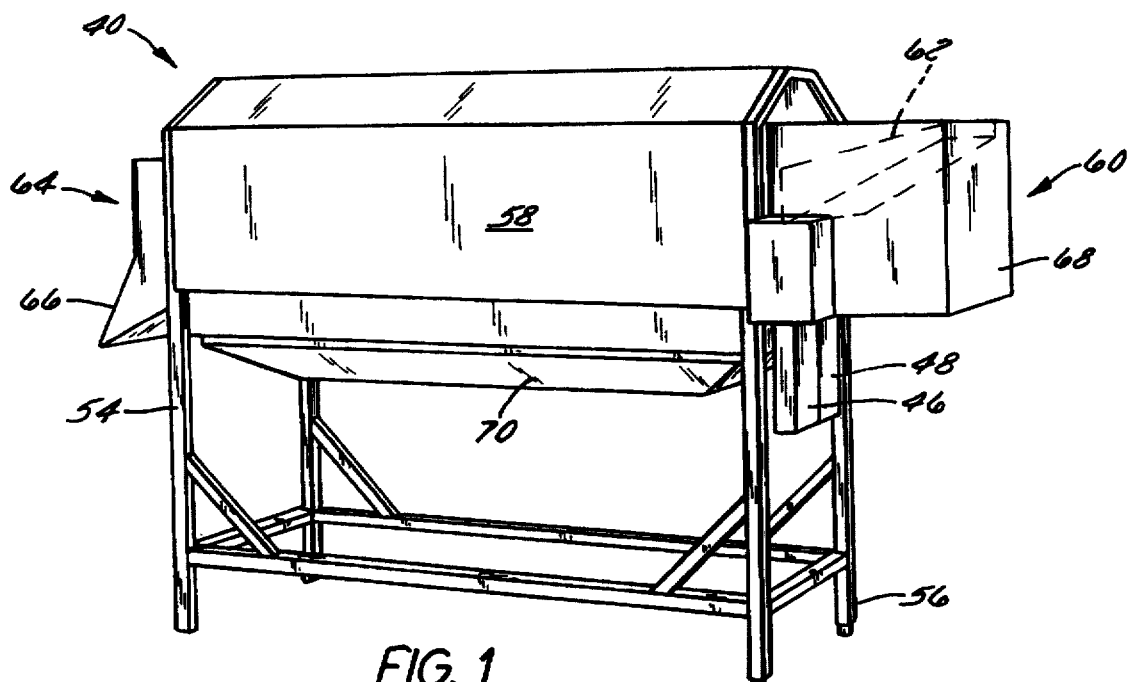
FIG. 1 is a perspective view of a stationary U-bed peeling and cleaning machine.

Food product enters the machine 40 at an inlet end 60 through an inlet chute 62 and exits the machine 40 at an outlet end 64 through a discharge chute 66. Typically, food product is carried by a conveyor (not shown) to the inlet chute 62 and processed food product is carried away from the discharge chute 66 by another conveyor (not shown). As is shown in FIG. 1, the machine 40 can have a shroud 68 at its inlet end 60 that substantially encloses the inlet chute 62 and covers all of the abrasive roller drive motors 44.

Figure 4:
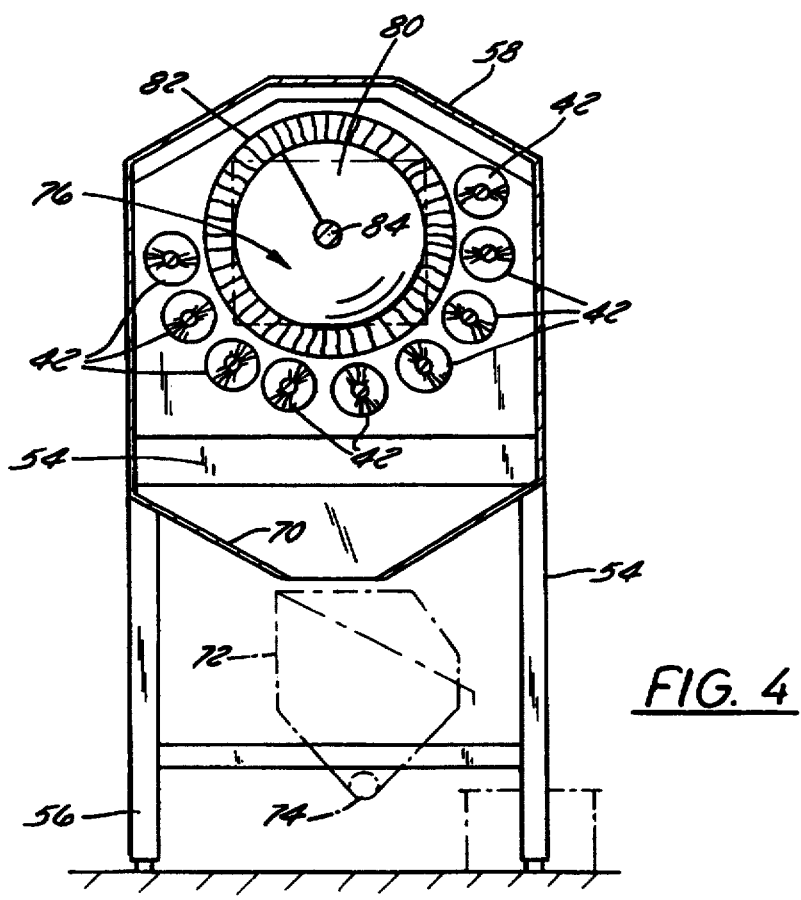
FIG. 4 is a transverse cross sectional view of the machine.

Referring to FIGS. 3 and 4, the abrasive rollers 42 are rotatively carried by the frame 54 in a generally upturned semicircular or U-shaped configuration defining a product receiving chamber 76 between the rollers 42. Received between the rolls 42 in the chamber 76 is an auger 78 that rotates during operation to urge food product received in the chamber 76 from the inlet end 60 toward the outlet end 64.

The auger 78 is constructed of a single generally helical and continuous flight 80 with bristles 82 that extend outwardly from its periphery to help urge food product through the machine 40 without damaging it. The auger flight 80 is carried by a shaft 84 that is rotatively carried by the frame 54. The frame 54 is shown in FIG. 3 having a pair of arms 86 that each extend downwardly from the top of the frame 54 to which an end of the auger shaft 84 is rotatively journalled. Each end of the shaft 84 is preferably rotatively supported by bearings carried by each auger support arm 86. Of course, the auger 78 and its shaft 84 may be mounted to the frame 54 in another manner.

To rotate the auger 78 during machine operation, there is an electric motor 88 connected to one end of the auger shaft 84. The auger drive motor 88 is shown in FIG. 3 connected to the shaft 84 adjacent the outlet end 64. The auger drive motor 88 is an electric motor having a power input lead 90, only a portion of which is shown in FIG. 3, that extends outwardly from the motor 88 and which is connected to the drive motor control box 46. During operation, electrical power is communicated from the power supply 48 through the control box 46 to the auger drive motor 88 to cause the motor 88 to rotate the auger 78. The control box 46 preferably is equipped with controls that enable an operator of the machine 40 to selectively vary the rotational speed of the auger 78 during operation.

Although the auger drive motor 88 is shown in FIG. 3 directly coupled to the auger shaft 84, it preferably can be connected to the shaft 84 by a gear reducer that can be an axially in-line gear reducer 92 or a right-angled gear reducer for communicating more torque to the shaft 84 to ensure auger rotation particularly when the auger 78 is relatively heavily loaded by food product in the chamber 76. So that the auger drive motor 88 can rotate the auger 78, the motor 88 is immovably anchored to the frame 54, such as by being anchored to the auger support arm 86. If a gear reducer is used, the gear reducer, is immovably anchored also immovably anchoring the motor 88.

The auger 78 is shown in FIG. 3 extending the full longitudinal length of the peeling and cleaning machine 40. If desired, the auger 78 can be shorter than that shown and used alone or in combination with a gate (not shown) to urge and control food product flow through the machine 40. If desired, the machine 40 can be used without an auger 78 if the machine is equipped with another mechanism for urging food product through the chamber 76. One example is a mechanism for tilting the machine 40 downwardly from its inlet end 60 toward its outlet end 64. An example of such a mechanism is support legs of different lengths or which are length adjustable such that the legs 56 adjacent the inlet end 60 are longer than the legs 56 adjacent the outlet end 64 downwardly tilting the machine 40 from its inlet end 60 toward its outlet end 64. With or without an auger 78, the machine 40 can be downwardly tilted from its inlet end 60 toward its outlet end 64.

Each abrasive roller 42 is journalled for rotation at one end in an end plate 118 of the frame 54 of the peeling and cleaning machine 40 adjacent the outlet end 64 and at its other end in another end plate 120 of the frame 54 adjacent the inlet end 60. Referring additionally to FIG. 7, each abrasive roller 42 consists of an elongate cylindrical core 94 that has an abrasive exterior 96. Examples of suitable abrasive roller exteriors 96 include nylon or elastomeric brushes that extend radially outwardly from the core 94, axially spaced apart flexible rubber discs carried on the core 94, axially and circumferentially spaced flexible elastomeric fingers carried on the core 94, and abrasive grit applied directly to the exterior of the core 94 or on a substrate carried by the core 94.

The core 94 preferably has a hollow 98 at each end for receiving a mandrel 100 and 102 of a roller support assembly 104 and 106. At the driven end of the roller 42, the mandrel 100 has a female recess 108 for receiving a complementary male drive shaft coupling 110 that is operably connected to an output shaft 52 of the motor 44. If desired, the coupling 110 or mandrel 100 can also include a bearing (not shown) journalled to the frame 54 of the machine 40 for helping to rotatively support the roller 42. The coupling 110 has a generally square box-shaped head 112 that is received in a complementary box-shaped recess 108 in the mandrel 100. The coupling 110 preferably has a hollow shank 111 with at least one radially outwardly extending key inside the hollow 113 of the shank 111 that mates with a complementary slot or keyway 115 in the drive motor output shaft 52 or 122 when the shank 111 is telescoped over the output shaft.

At the non-driven end of the roller 42, the mandrel 102 mates with a bearing 114 and a stub support shaft 116. The bearing 114 and stub shaft 116 preferably are journalled to the frame 54 of the machine 40 to rotatively support the roller 42 opposite its driven end.

Each abrasive roller drive motor 44 is an electric motor 44 that is a direct current or alternating current electric motor 44 having a horsepower rating of at least about one-eighth (⅛) horsepower. In a preferred embodiment, each roller drive motor 44 is an alternating current motor 44 that preferably is of three phase construction having a horsepower rating of about one-half (½) horsepower.

To provide the necessary output torque to turn an abrasive roller 42 at a rotational speed of as low as about 100 revolutions per minute (rpm) and as fast as about 600 rpm or faster while the roller 42 is experiencing full load conditions, the motor 44 preferably is a gear motor 126 that utilizes some form of gear reduction 50 to step down the speed of the electric motor output shaft 52 to another output shaft 122 having a rotational speed falling between about 100 rpm and about 600 rpm thereby providing greater torque. Typically, for most peeling and cleaning applications, the rollers 42 are each driven at a rotational speed of between about 300 rpm and about 400 rpm. Preferably, the motor 44 includes a gear reducer 50 mounted to its output shaft 52 with the gear reducer 50 having an output shaft 122 coupled to the abrasive roller 42.

While the gear reducer 50 can be helical gear gear reducer (not shown) it preferably is a cycloidal gear reducer 124, such as the cycloidal gear reducer 124 shown in FIG. 9. The cycloidal gear reducer 124 has an outer ring gear housing 128 with a plurality of ring gear rollers and pins 130 disposed between the housing 128 and a pair of axially spaced cycloid discs 132 and 134 each of which has a plurality of circumferentially spaced apart bores 136 of oversized construction for each bore receiving a slightly smaller slow speed shaft roller and pin 138 therein coupling the cycloid discs 130 and 132 to a power transfer disc 140. Each cycloid disc 130 and 132 is supported by an eccentric roller assembly upon separate eccentric cams 142 and 144 that are both carried by a gear reducer input shaft 146 that preferably is the output shaft 52 of the motor 44 or directly coupled to the output shaft 52 of the motor 44 for rotation in unison therewith. The bores 136 are larger in size than the diameter of the slow speed shaft rollers 138 to accommodate the radial outward movement of each cycloidal disc 132 and 134 riding on the eccentric cams 142 and 144 rotated by the input shaft 146 while also being engaged by the sidewalls of the bores 136 to displace the slow speed shaft rollers 138 in a circumferential direction thereby transmitting torque from the cycloid discs 132 and 134 to the power transfer disc 140 and output shaft 122.

The input shaft 146 is rotatively supported by a first bearing 148 carried by the gear reducer housing 128 and a second bearing 150 axially adjacent the power transfer disc 140. The power transfer disc 140 is directly coupled to the output shaft 122 of the gear reducer 50 for rotation in unison therewith. The input shaft 146 terminates within the housing 128 axially adjacent the output shaft 122. The cycloid discs 132 and 134 have a periphery made up of generally wavy or sinusoidally shaped teeth 152 which are in rolling contact with one or more of the ring gear rollers and pins 130 during operation. Although a pair of cycloidal discs 132 and 134 are shown in FIG. 9, the gear reducer 124 can have more than two cycloidal discs.

Preferably, the lobe or thickest part of both eccentric cams 142 and 144 are at least slightly out of phase relative to each other so that rotation of the input shaft 146 urges one of the cycloidal discs radially outwardly relative to the other of the cycloidal discs during each rotation causing the slow speed shaft rollers and pins 138 to rotate or orbit about the input shaft 146. As a result, rotation of the input shaft 146 is transmitted via the cams 142 and 144 to the cycloid discs 132 and 134 where the slow speed shaft rollers and pins 138 communicate the motion to the power transfer disc 140 which in turn causes the gear reducer output shaft 122 to rotate. As the gear reducer output shaft 122 rotates, the abrasive roller 42 coupled to the output shaft 122 also rotates, preferably in unison. During operation, the input shaft 146 of the gear reducer 124 is rotated by the output shaft 52 of the motor 44 causing the output shaft 122 to rotate at a speed slower than the speed of the input shaft 146 for providing greater torque output to the abrasive roller 42 enabling the electric motor 44 to drive the roller 42 at a sufficient speed and with great enough torque to handle the load of fruits, vegetables and any other food products coming into contact with the roller 42 during peeling or cleaning.

Preferably, the cycloidal gear reducer 124 is constructed substantially in accordance with at least one of the gear reducers or gearmotors disclosed in catalog no. 04.301.50.007 of Sumitomo Machinery Corporation of America entitled *SM-Cyclo® Speed Reducers & Gearmotors* 3000 *Series* and U.S. Pat. No. 5,484,345 assigned to Sumitomo Heavy Industries, Ltd., the disclosures of both of which are hereby expressly incorporated by reference. Cycloidal gear reducers 124 are particularly well suited for the application at hand because of their ability to withstand rather large shock loads without damage, similar to what can be encountered when fruits or vegetables being peeled or cleaned come into contact with a rotating abrasive roller 42.

Preferably, the abrasive roller drive motor 44 is a three phase alternating current one-half (½) horsepower Leeson Waterduck Forty-two frame motor, manufactured by Leeson Electric Corporation of Waterford, Wisconsin, having a C-face connector to which a Sumitomo model CN-FJS-4085Y-6:1 cycloidal gear reducer 124 is mounted. If desired, the abrasive roller drive motor 44 can be a gearmotor 126 having an integral cycloidal gear reducer 124. Preferably, the gearmotor 126 is a Sumitomo SM-Cyclo® gearmotor model no. 3085 having an integral cycloidal gear reducer 124 of single reduction construction and possessing a horsepower output rating of one-half (½) horsepower.

Figure 5:
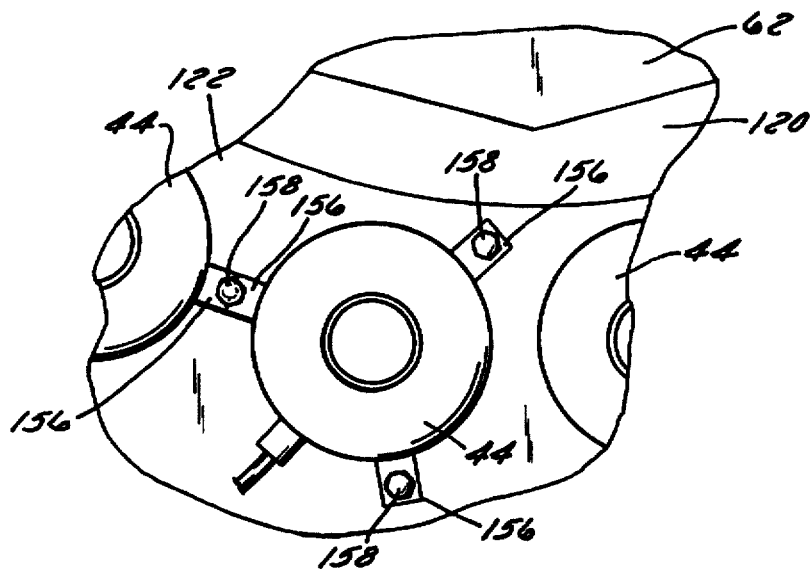
FIG. 5 is an enlarged fragmentary view of a roller drive motor showing it mounted to the machine.
Figure 6:
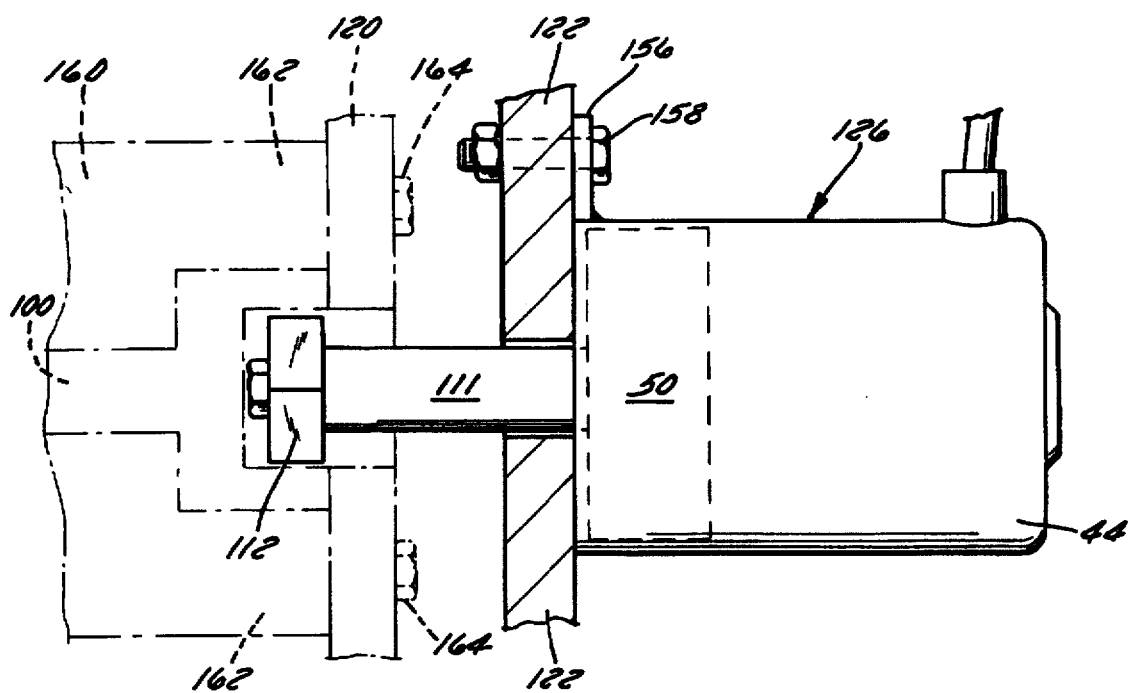
FIG. 6 is an enlarged side view of the motor mounted to a motor mounting plate and a portion of an abrasive roller mounted to an end plate of the machine.

FIGS. 5 and 6 show the roller drive motor 44 mounted to a motor mounting plate 154 that is attached to the frame 54 outwardly of the inlet end plate 120. As is shown in FIG. 5, each motor 44 has at least two or more mounting tabs 156 that each cooperate with a fastener 158 to secure the motor 44 to the mounting plate 154. One or more mounting tabs 156 of adjacent motors 44 can share a common fastener 158 for enabling the motors 44 to be mounted in close proximity to each other. As is shown in phantom in FIG. 6, the mandrel 100 of the driven end of the roll 42 is rotatively received in a collar 160 having a radially outwardly extending flange 162 mounted by a fastener 164 to the inlet end plate 120.

In a preferred embodiment of the peeling and cleaning machine 40 shown in FIG. 2, the machine 40 has a drive motor power supply 48 that supplies electrical power to a drive motor control box 46 that distributes electrical power to each of the drive motors 44. Together, the control box 46 and power supply 48 form a motor control system 166 that supplies electrical power to each of the drive motors 44 to cause them to rotate the rollers 42 at a rotational speed suitable for cleaning food product, peeling food product or otherwise abrasively processing food product. Preferably, the control system 166 is capable of supplying electrical power to each motor 44 in a manner where the speed of each motor 44 and roller 42 can be varied and controlled independently relative to each of the other motors 44 and rollers 42, or all of motors 44 and rollers 42 can be driven at about the same speed. Preferably, the motor control system 166 is constructed and arranged such that the direction of rotation of the motors 44 and rollers 42 can be reversed during operation, if necessary.

The drive motors 44 can be controlled by the control system 166 such that alternating current electrical power from an external power source, such as a three phase alternating current power source from an electric utility, is directed through the control system 166 which processes the electrical power signal to controllably deliver three phase alternating current to each motor 44 in a manner such that the rotational speed of the output shaft 52 of each motor 44 can be controlled to relatively accurately control the rotational speed of each abrasive roller 42. If a gear reducer 50 is used, the rotational speed of the gear reducer output shaft 122 preferably will be less than the rotational speed of the motor output shaft 52.

The control system 166 includes at least one motor controller 168 that can be of programmable construction and which is represented in FIG. 2 by box 48 that has an output (not shown) leading to the control box 46 which, in turn, serves as a junction box to deliver power to the power input lead 170 of each motor 44. Preferably, the motor controller 168 is a variable frequency alternating current drive 172 that can be a Danfoss model no. 7.5 horsepower inverter model VLT3008, 175H1745 along with NEMA kit no. 175H7707 manufactured by Danfoss, Inc. of Rockford, Ill. Preferably, the auger drive motor 88 is also controlled by the motor controller 168, which preferably is a separate motor controller, such as a Danfoss VLT 2020, 195H3301 along with NEMA kit 175H7707, in a similar fashion to relatively accurately control the rotational speed of the auger 78.

Each power input lead 90 of the auger motor 88 and each power input lead 170 of each drive motor 44 are of four wire construction having three wires for each carrying one phase of the alternating current supplied to the motors and another wire that is a ground wire. Preferably, each lead 90 and 170 can be of shielded construction for minimizing the impact of electrical interference on motor operation.

FIG. 10 illustrates a second preferred embodiment of a motor control system 166' that combines auger control and roller drive motor control into a single cabinet 174 that replaces the drive motor control box 46 and drive motor power supply 48 shown in FIG. 2. The cabinet 174 has a recessed enclosure 176 with a door 178 that serves as a control panel 180 that controls operation of both the auger 78 and the abrasive rollers 42. One side of the control panel door 178 is attached to the recessed enclosure 176 by a hinge 182 and the other side of the door 178 is releasably secured to the enclosure 176 by a latch 184. When unlatched, the door 178 can be swung about the hinge 182 to reveal the components inside the enclosure 176.

On the face of the control panel 180 are controls dedicated to controlling the operation of the peeling and cleaning machine 40. The control panel 180 includes a push button electrical switch 186 for starting the abrasive roller drive motors 44 and another push button electrical switch 188 for starting the auger drive motor 88. The control panel 180 also has a push button electrical switch 190 for stopping the auger drive 88 and another push button electrical switch 192 for stopping the abrasive roller drive motors 44. As a result of the arrangement of these controls, the auger 78 and abrasive rollers 42 can be started and stopped independently of each other. To stop both the abrasive rollers 42 and auger 78 at the same time, the control panel 180 also has an emergency stop push-pull button electrical switch 198.

To control the speed of the abrasive rollers 42, the control panel 180 includes a rotary switch 194 that preferably is a variable resistor or potentiometer which can be selectively manually turned or rotated by an operator of the machine 40 to selectively speed up or slow down the rollers 42. The rotational speed of the abrasive rollers 42 preferably is reflected by a display 196 that can be an LED or LCD display which preferably displays the rotational speed of the rollers 42 in revolutions per minute.

An exemplary speed range of 0, 30, 60, and 100 is shown adjacent the abrasive roller speed control 194. The printed range shown preferably is indicative of the percentage of maximum output frequency of the variable frequency electric motor drive 172. Preferably, the output frequency of the drive can be varied between about twelve Hertz and about sixty Hertz and can be operated at a frequency as high as one hundred and twenty Hertz for controlling the speed of the abrasive roller drive motors 44 and abrasive rollers 42. The output frequency of the variable frequency drive 172 preferably is directly proportional to the rotational speed of each of the drive rollers 42.

To control the speed of the auger 78, the control panel 180 includes a rotary switch 200 that preferably is a variable resistor or potentiometer which can be selectively manually turned or rotated by an operator of the machine 40 to selectively speed up or slow down the auger 78. The rotational speed of the auger 78 preferably is reflected by a display 202 that can be an LED or LCD display which preferably displays the rotational speed of the auger 78 in revolutions per minute.

An exemplary speed range of 0, 30, 60, and 100 is shown adjacent the auger speed control 200. The printed range shown preferably is indicative of the percentage of maximum output frequency of a variable frequency electric motor drive dedicated to driving the auger motor 88. Preferably, the output frequency of the drive can be varied between about twelve Hertz and about sixty Hertz and can be operated at a frequency as high as one hundred and twenty Hertz to control the speed of the auger drive motor 88 and auger 78. The output frequency of the variable frequency auger drive preferably is directly proportional to the rotational speed of the auger 78.

Figure 11:
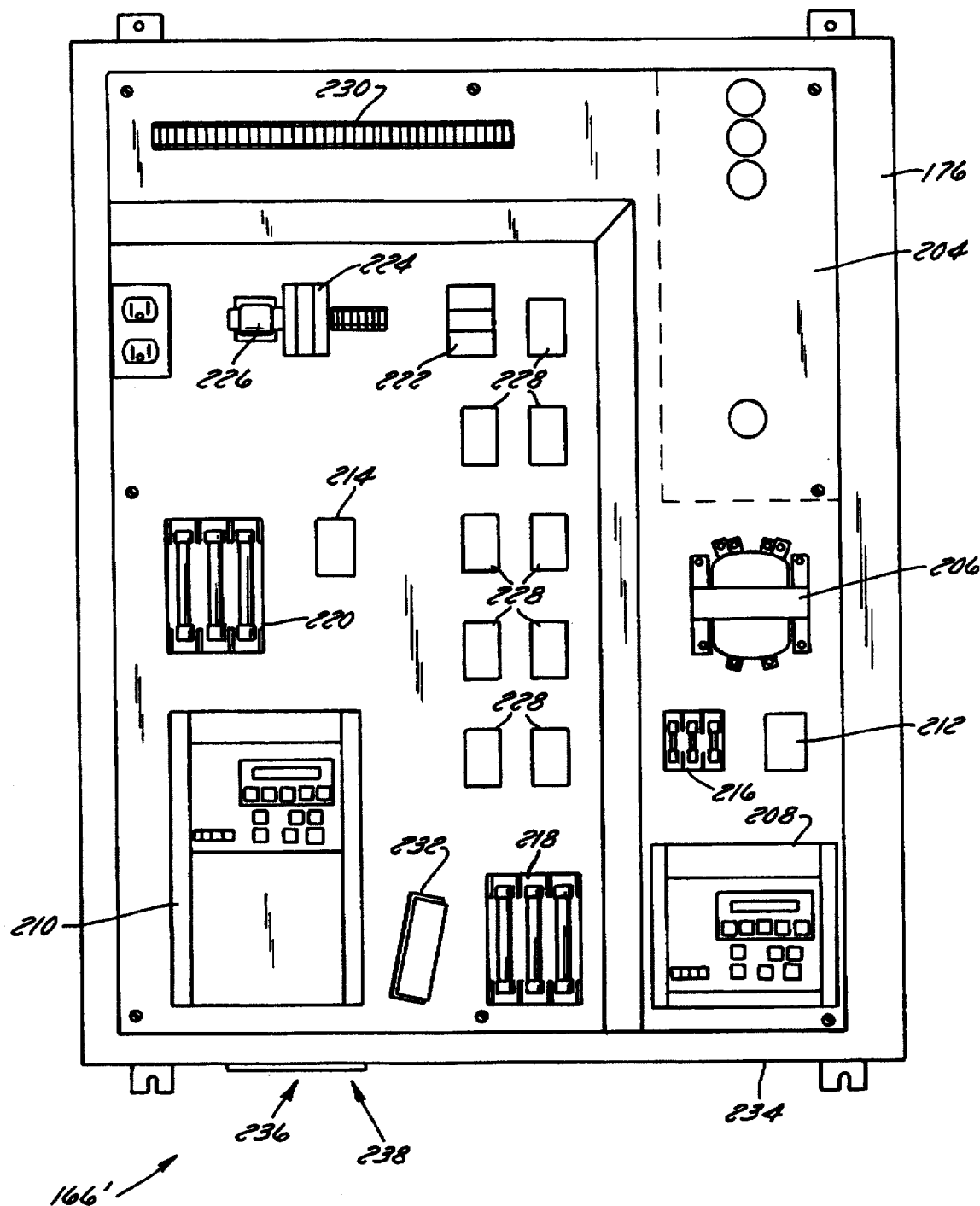
FIG. 11 depicts the internal components of the control unit.

FIG. 11 illustrates the motor control system enclosure 176 with its door 178 open or removed exposing the components inside the enclosure 176. Within the enclosure 176 is a power supply block 204 for bringing electrical power from an external power source, such as an electric utility or the like, to the motor control system 166'. Preferably, three phase (3φ) electrical power having a voltage of about 480 volts and able to provide an amperage of up to at least thirty amps is supplied by the external power source to the power supply block 204. Although not shown in FIG. 11, the power supply block 204 preferably also includes a disconnect switch 240 (FIG. 12) for disconnecting electrical power to the entire motor control system 166', a fuse block 242 (FIG.

12) that preferably is a 600 volt fuse block containing at least three sixty amp 600 volt fuses for preventing power spikes from damaging the control system 166', and a power distribution block to which one or more of the components further discussed herein are ultimately connected.

Figure 12:
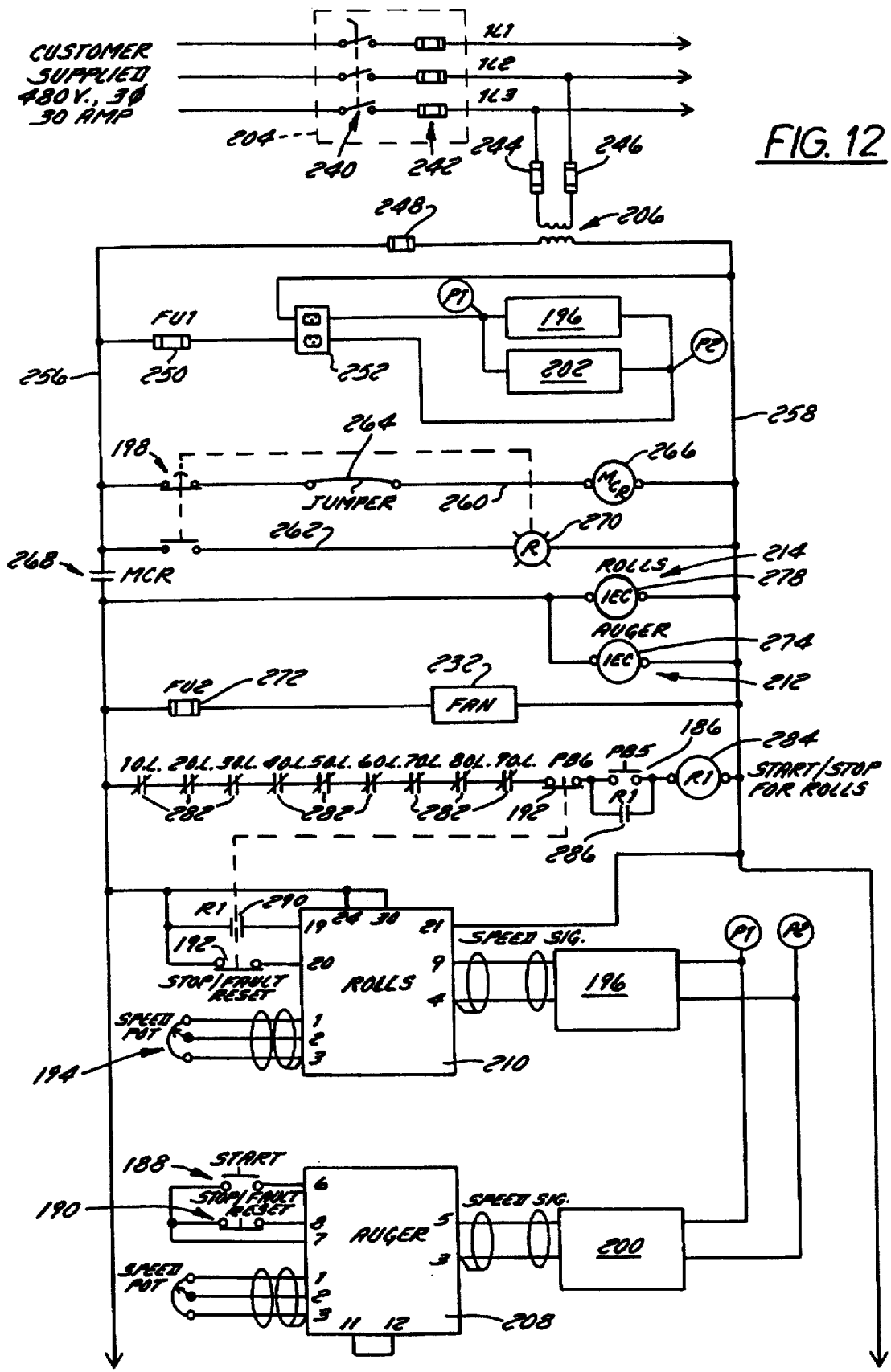
FIG. 12 is one part of an electrical control schematic of the control unit.
Figure 13:
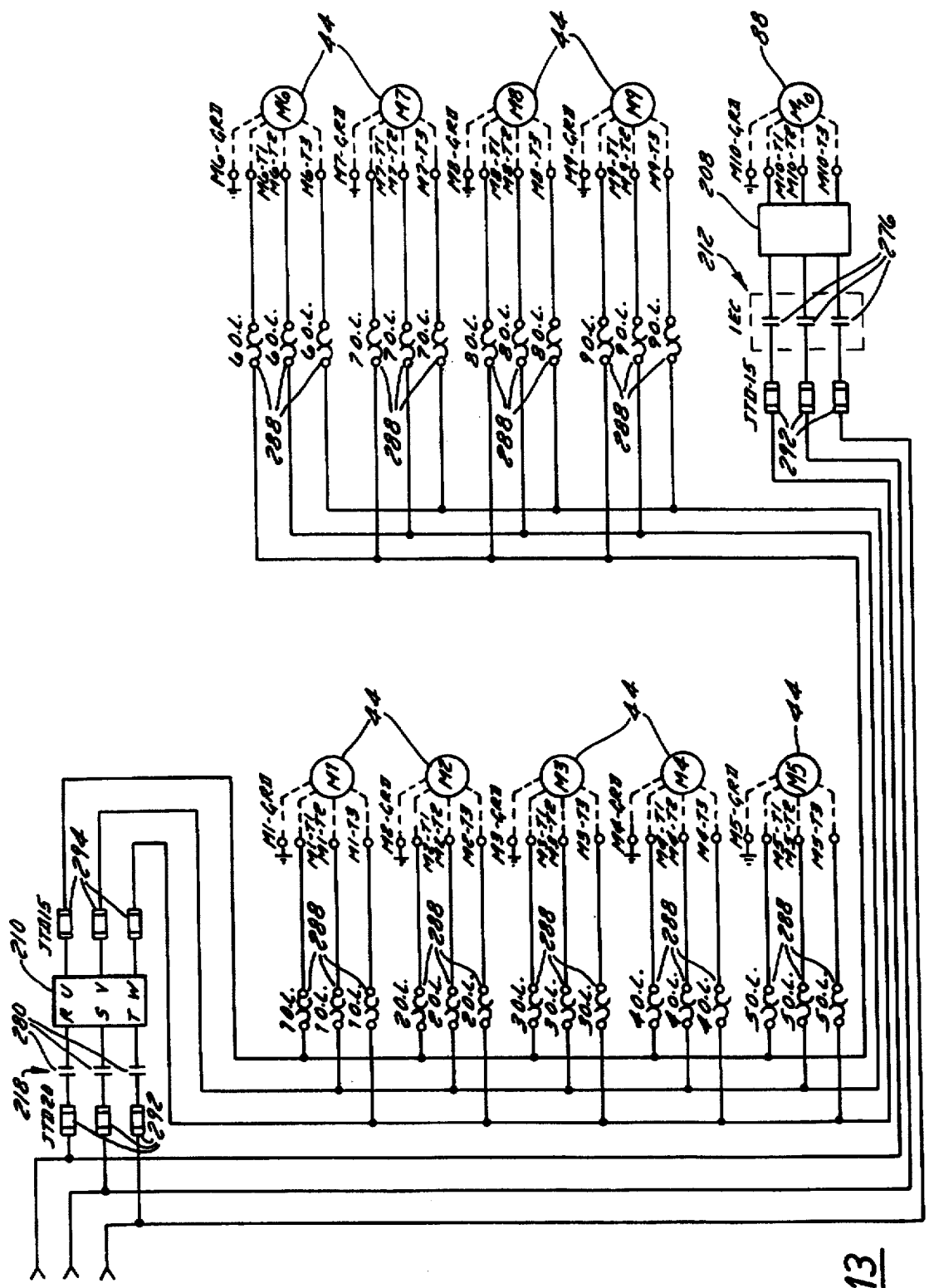
FIG. 13 is the other part of the schematic.

Referring additionally to FIGS. 12 and 13, electrical power from the power distribution block of the power supply block 204 is communicated to a step down transformer 206 that outputs electrical power at a voltage of 120 volts at its output terminals. Part of its output is supplied to a variable frequency motor drive 208 that controls operation of the auger drive motor 88 and another part of its output is supplied to a variable frequency motor drive 210 that controls operation of all of the abrasive roller drive motors 44.

Preferably, the variable frequency auger motor drive 208 is an Allen-Bradley model no. 1305 adjustable frequency AC drive (series C) manufactured by Allen-Bradley of Milwaukee, Wis., that is constructed, arranged and operates substantially as described in its user manual entitled 1305 *Adjustable Frequency AC Drive (Series C)* and subtitled *0.37–4 kW (0.5–5 HP), FRN 6.01 and Up*, the disclosure of which is hereby expressly incorporated by reference herein. Preferably, the variable frequency abrasive roller motor drive 210 is an Allen-Bradley model no. 1336 adjustable frequency AC drive manufactured by Allen-Bradley of Milwaukee, Wis., that is constructed, arranged and operates substantially as described in its user manual entitled 1336 *PLUS Adjustable Frequency AC Drive and subtitled 0.37–448 kW (0.5–600 HP)*, the disclosure of which is hereby expressly incorporated by reference herein.

To energize the auger drive motor 88 to start the motor 88 when the auger drive start push button 186 is pressed, the enclosure 176 has a an IEC contactor 212 that is a motor starter which causes current to be supplied to the motor 88 when the button 186 is pressed. Likewise, to energize the abrasive roller drive motors 44, the enclosure 176 has another IEC contactor/motor starter 214 that causes current to be supplied to the motors 44 when the abrasive roller drive start push button 188 is pressed. Although the motor starters 212 and 214 are of IEC construction, NEMA-type motor starters can be used. To stop both the auger drive motor 88 and the roller drive motors 44 should an emergency occur, there is a master control relay (MCR) 222 connected to the emergency stop push button switch 198.

To protect the auger motor control and drive circuitry from damage due to power transients during operation, there is a fuse block containing fuses 216. To protect various components of the roller motor control and drive circuitry from power transients, there is a pair of fuse banks 218 and 220. To further protect the circuitry, there is a fusible terminal block 224 of preferably 600 volt construction adjacent a relay 226 that controls the start and stop of the abrasive roller drive motors 44. To protect each motor 44 from overload, there is a normally closed overload protection relay 228 in electrical communication with each motor 44.

To distribute electrical power from the abrasive roller variable frequency motor drive 210 to each of the abrasive roller motors 44, the enclosure 176 has an elongate terminal block 230 having a voltage rating of 600 volts and a plurality of terminals. To cool the abrasive roller variable frequency motor drive 210 during operation, there is a fan 232 mounted by a bracket in the enclosure 176 with the fan 232 aimed at the drive 210 such that its exhaust impinges against the drive 210 when the fan 232 is operating. To admit air into the enclosure 176 when the door 178 is closed, a bottom sidewall 234 of the enclosure has a through opening with a filter 236 for removing particulate matter from air entering the enclosure 176 that covers the opening and a drill 238 attached to the enclosure 176 which captures the filter 236.

The motor control circuitry is further presented in a ladder diagram control schematic shown in FIGS. 12 and 13. As is shown in FIG. 12, two branches 1L2 and 1L3 of the inputted three phase power are directed to step down transformer 206 where the voltage preferably is stepped down to about 120 volts to supply electrical power to each of the variable frequency motor drives 208 and 210, the motor starters 212 and 214, and the auger and roller drive motor speed displays 196 and 202. Each input of the transformer 206 preferably has a fuse 244 and 246 for protecting the transformer 206. Each fuse 244 and 246 preferably is a four amp fuse. At least one of the two output legs of the transformer 206 is also equipped with another fuse 248 that preferably is a five amp fuse.

The two output legs of the transformer 206 provide electrical power to a control circuit 254 that controls operation of both the auger drive motor 88 and roller drive motors 44. Wired to both of the output legs of the transformer 206 is a fuse 250, preferably of two amp construction, a 120 volt power outlet 252, and the power input terminals of both the auger and roller drive speed displays 196 and 202. The legs of the transformer output communicate electrical power to a first branch 256 and a second branch 258 of the control circuit 254.

The emergency stop circuitry consists of the push-to-stop, pull-to-start push button switch 198, that is of double circuit construction, with the switch 198 shown in FIG. 12 in a normally closed position in an emergency stop circuit branch 260 and normally open in an emergency stop indicating circuit branch 262. When the upper portion of the switch 198 is in its normally closed position, current flows through a jumper 264 and a coil 266 of the MCR 222 which in turn energizes a relay 268 in series in branch one 256 of the control circuit 254 causing power to be supplied to the rest of the circuit 254. The jumper 264 can be removed and replaced with one or more series wired emergency stop switches (not shown) of like or similar configuration to switch 198 for enabling operation of the peeling and cleaning machine 40 to be interrupted at locations remote from the control panel 180. When the emergency stop button 198 is pushed, it closes the emergency stop indicating circuit 262 causing an indicator light 270 in the face of the button 198 to light up thereby providing a visual indication that the emergency stop button 198 has indeed been pushed.

With the emergency stop button 198 in its normal operating position (shown in FIG. 12) such that the emergency stop circuit 260 is closed, current flow through the circuit branch 260 energizes the MCR coil 266 causing the MCR relay 268 to close which, in turn, causes electrical power to be supplied to the rest of the control circuit, including the cooling fan 232, the auger drive motor and roller drive motor starters 212 and 214, and the roller drive motor variable frequency drive 210. Preferably, there is a one amp fuse 272 wired in series with the fan 232.

With the MCR relay 268 closed, electrical power is supplied to a coil 274 of the auger motor starter 212 thereby closing corresponding normally-open relays 276 (FIG. 13) of the motor starter 212 thereby enabling the auger drive motor 88 to be driven by its variable frequency drive 208. When the auger motor starter coil 274 is energized by application of electrical current, it closes a relay 276 in each of the circuit branches communicating one phase of three phase electrical power to and through the variable frequency auger motor drive 208. Likewise, when the MCR relay 268 is closed, power is supplied to a coil 278 of the roller drive motor starter 214 closing corresponding relays 280 (FIG. 13) of the motor starter 214 enabling the roller drive motors 44 to be driven by its variable frequency drive 210.

To control the starting and stopping of the abrasive roller drive motors 44, there are a plurality of normally-closed overload relays 282 in series with the roller drive motor stop push button switch 192, the roller drive motor start push button switch 186, and a motor start coil 284. A motor startup relay 286 is wired in parallel with the start switch 186 and is closed due to the coil 284 being energized when the start switch 186 is pressed. When the start button 186 is pressed, the start coil 284 also energizes another relay 290 which provides a start input to the roller motor variable frequency drive 210. The relay 286 remains closed after the start switch 186 is released causing power to be supplied to the roll drive motors 44 until the stop switch 192 is pressed breaking the circuit.

There is an overload relay 282 for each roll drive motor 44. For each drive motor 44 there is a current overload sensor 288 in series with the power supplied to the motor 44 for sensing current flow along each phase of the three phase current delivered to the motor 44 during operation and communicating with the overload relay 282 if current rises above a certain threshold. Should the current flow to a motor 44 along any phase branch become too great indicating that the motor 44 may be overheating, the overload sensor 288 will open its relay 282 stopping all of the roller drive motors 44 by stopping electrical power flow to all of the motors 44 thereby preventing motor damage.

Power is provided to inputs 20, 24, 30 and 21 of the roller motor drive 210 and to a variable frequency drive start input 19 when start relay 290 is closed by the pressing of the start switch 186. The stop button 192 preferably is of double circuit construction. When the stop button 192 is pressed, it opens the start circuit and deenergizes the start relay 286 while also stopping power to stop input 20 of the variable frequency drive 210. When no power is applied to stop input 20, the variable frequency drive 210 ceases to supply three phase power to the roller drive motors 44. When power to variable frequency drive input 20 is ceased, a stop/fault reset is executed by the variable frequency drive 210 causing it to block power flow to the motors 44.

To control roller motor speed and hence control abrasive roller speed, the drive roller speed control 194 is a potentiometer connected to inputs 1, 2 and 3 of the variable frequency drive 210. The leads from the potentiometer speed control 194 are preferably shielded. As the potentiometer 194 is rotated in one direction, it causes the variable frequency drive 210 to increase both the voltage and frequency of the three phase power supplied to each of the roller motors 44 thereby increasing their speed. As the potentiometer 194 is rotated in the opposite direction, the variable frequency drive 210 reduces both the voltage and output frequency of the three phase power supplied to the motors 44 thereby slowing their speed.

Outputs 9 and 14 of the variable frequency drive 210 are in electrical communication with the roller speed display 196 and communicates to the display 196 a signal that is preferably representative of or proportional to the rotational speed of the rolls 42. The electrical leads communicating the signal from the variable frequency drive to the display preferably is shielded.

The auger start button is connected to inputs 6, 7 and 8 of the auger motor variable frequency drive 208. When pressed, it provides a start up signal to the drive 208 causing the drive 208 to start the auger drive motor 88. When the auger stop button 190 is pressed to stop the auger 78, it breaks the circuit between input 7 and 8 of the drive 208 causing a stop/fault reset condition to occur which, in turn, causes the drive 208 to cease power flow to the auger drive motor 88. The auger variable frequency drive 208 is internally powered by the 480 volt three phase power supply.

To control the speed of the auger 78, the auger speed control 200 is a potentiometer connected to inputs 1, 2 and 3 of the drive 208. A signal representative of or proportional to the auger speed is transmitted from outputs 5 and 3 to the auger speed display 202.

Referring to FIG. 13, each phase of the 480 volt three phase power supply is connected to the R, S and three phase motor power inputs of the variable frequency drives 208 and 210. There is a fuse 292 before each three phase motor power supply input. A phase is outputted from each of the U, V and W outputs of the variable frequency drives. Preferably, each output also has a fuse 294.

Each of the roller motors 44 is wired in parallel to the outputs U, V and W of the roller motor variable frequency drive 210 such that all of the motors 44 are driven by the drive 210. If it is desired to drive each motor 44 separately, a variable frequency drive 210 can be used for each roller motor 44 with a corresponding set of controls 186, 192, and 194 for each drive 210 used. For example, if it is desired to have four rollers 42 independently controlled relative to the other five rollers 42, a bank of four roller drive motors 44 can be driven by one drive 210 along with a set of controls 186, 192 and 194 and the other bank of five roller drive motors 44 can be driven by another drive 210 along with a set of controls 186, 192 and 194 with the control circuitry for both drives 210 and banks of roller drive motors 44 constructed generally in accordance with that presented in FIGS. 10–13.

FIGS. 14–19 illustrate a rotating cage peeling and cleaning machine 40' of this invention having each of its abrasive rollers 42 driven by an electric motor 44. Preferably, the machine 40' has an auger 78 that is also driven by a motor 88, although the machine 40' can be constructed without an auger 78 providing the machine 40' is equipped with another mechanism or means for facilitating and controlling movement of food product 41 through the food product receiving chamber 76 of the machine 40'. Where an auger 78 is used to urge food product 41 through the machine 40', the abrasive roller drive motors 44 are controlled by a variable frequency drive and the auger drive motor 88 is controlled by another variable frequency drive in a manner described above and depicted generally in FIGS. 10–13.

Figure 14:
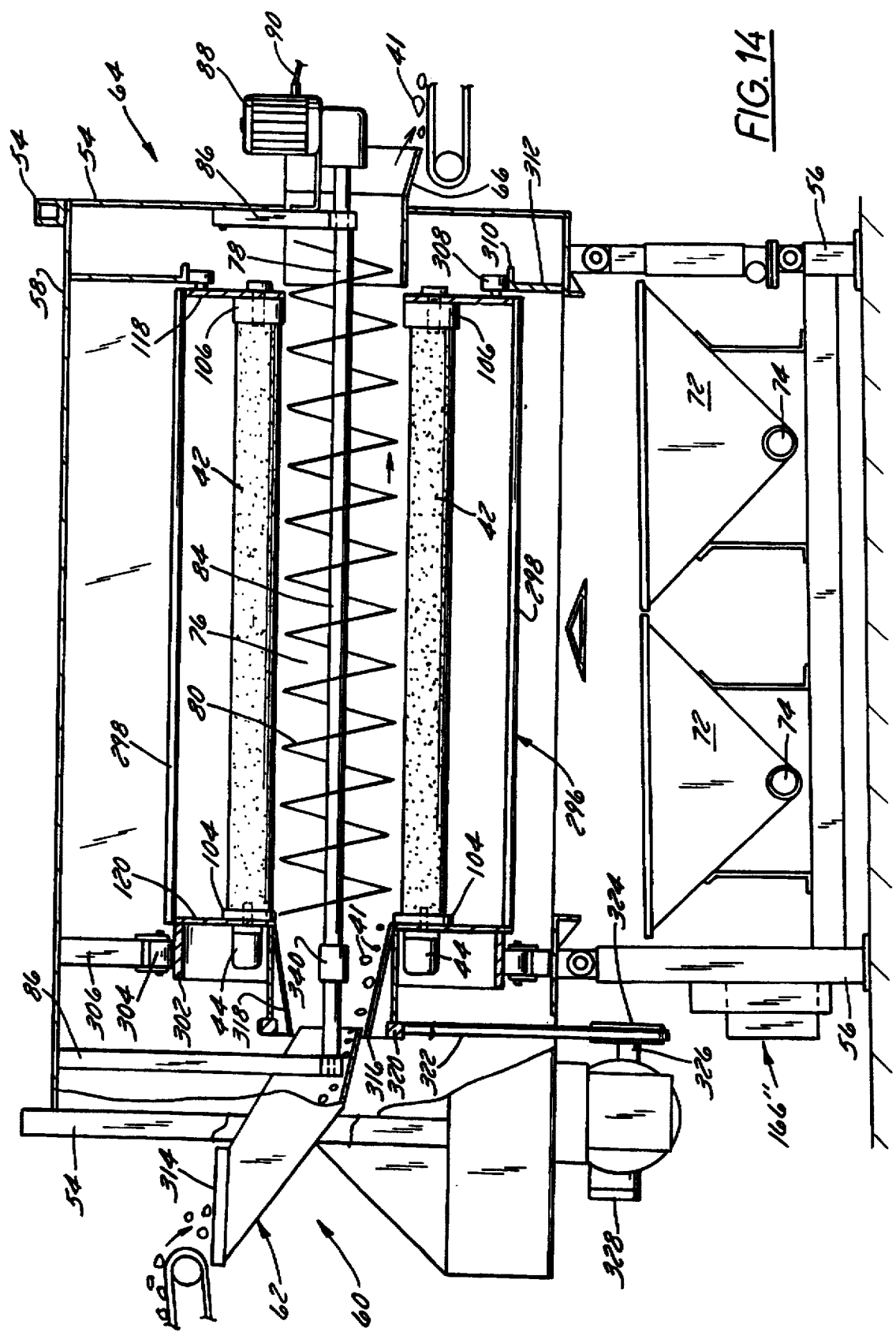
FIG. 14 is a longitudinal sectional view of a rotating cage peeling and cleaning machine.
Figure 15:
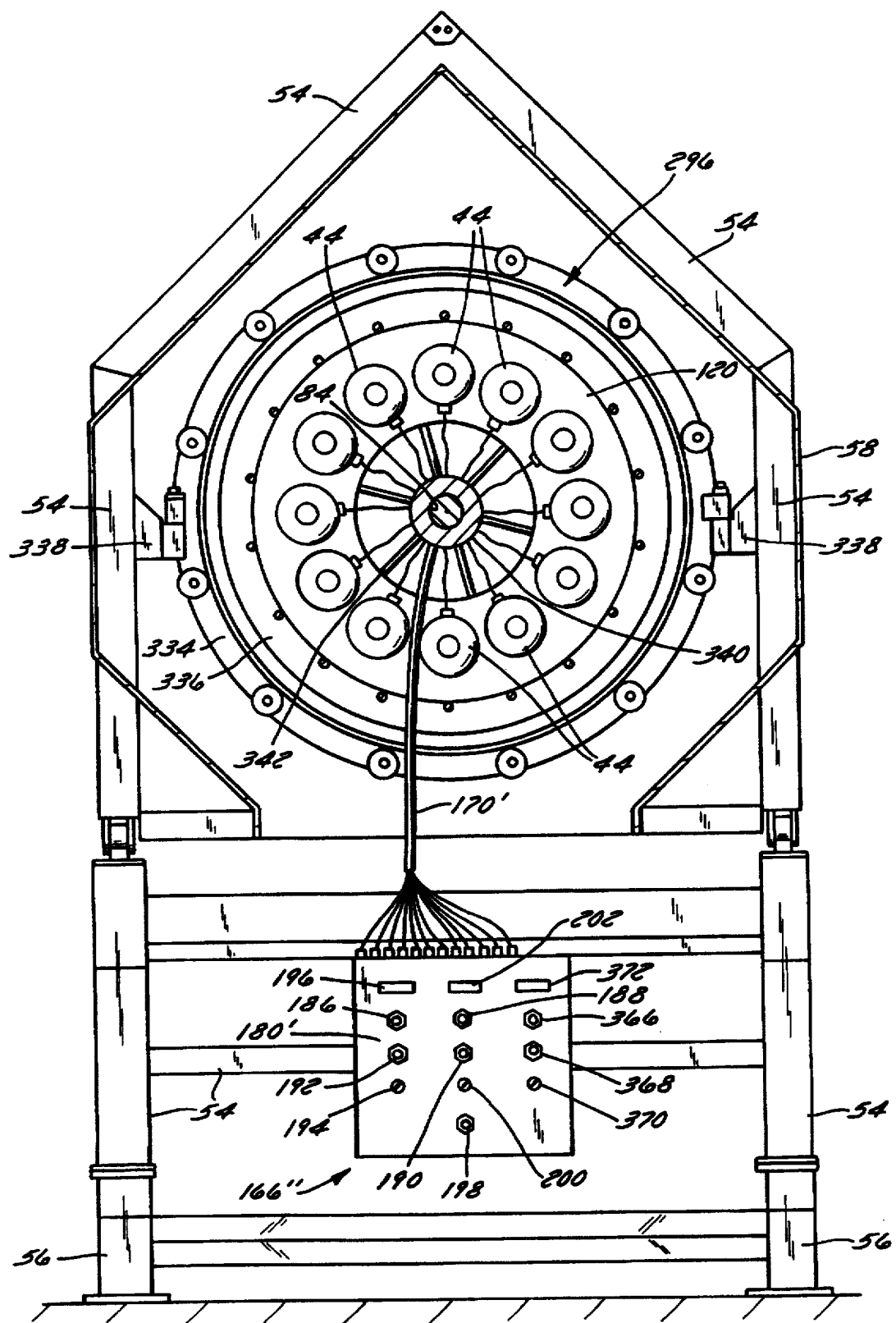
FIG. 15 is an end view of the rotating cage machine illustrating a plurality of electric abrasive roller drive motors connected to an armature or commutator for receiving electrical power from the control unit.
Figure 16:
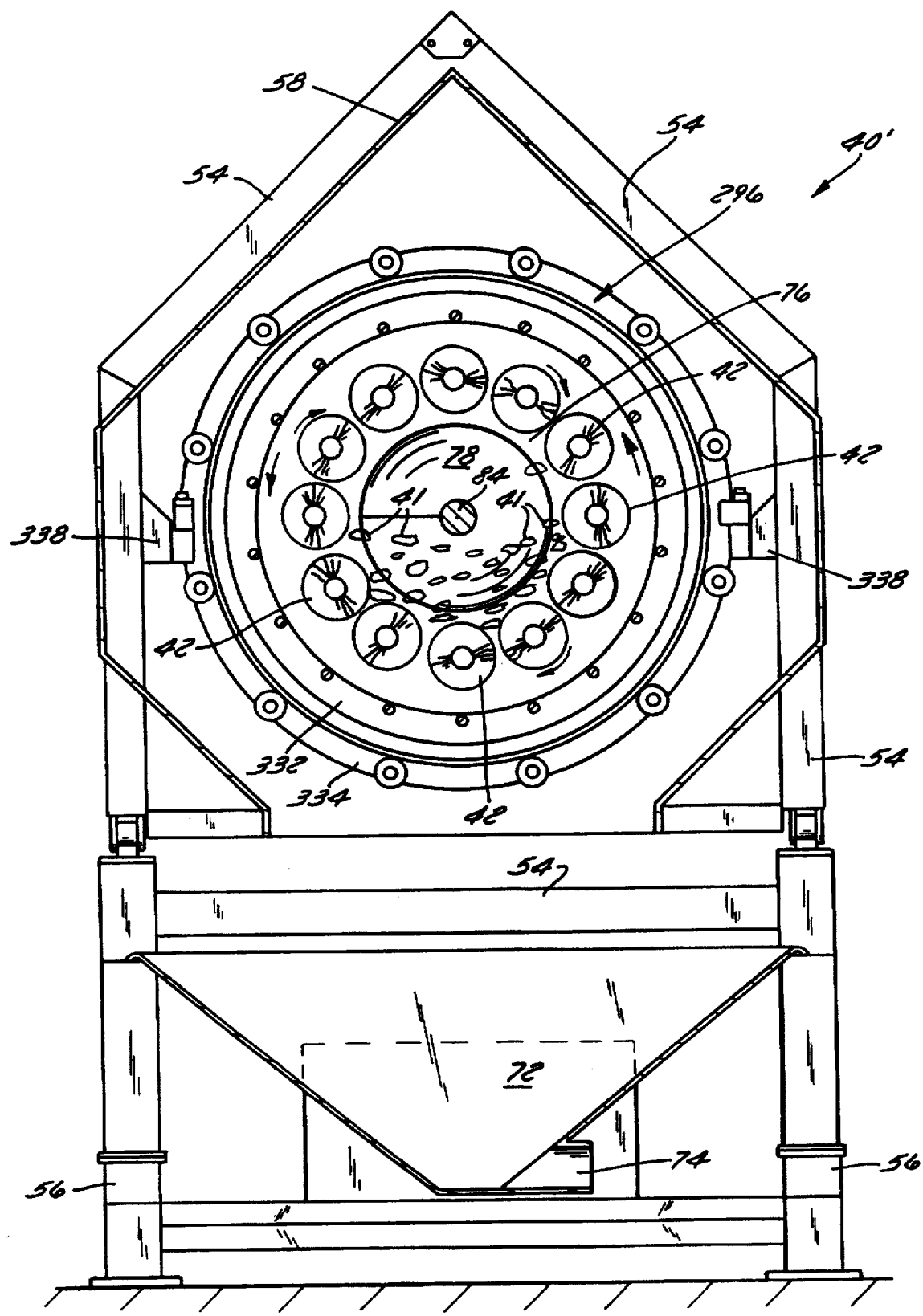
FIG. 16 is a transverse cross sectional view of the rotating cage peeling and cleaning machine.

As is shown in FIG. 14 and 15, the rolls 42 are carried by an elongate and generally cylindrical cage 296 constructed and arranged such that the rollers 42 are journalled at each end in an end plate 118 and 120 that is rotatively carried by the frame 54 of the machine 40' and makes up the cage 296. Preferably, a plurality and at least about four rollers 42 are arranged to form an the cage 296 while also forming an elongate and generally cylindrical product receiving chamber 76 inside the cage 296. Twelve motors 44 and rollers 42 are depicted in FIGS. 15 and 16. The cage 296 preferably also includes at least two elongate struts 298 that join the end plates 118 and 120 and which, along with the rollers 42, impart strength and structural rigidity to the cage 296. Preferably, the cage 296 has a plurality of circumferentially spaced apart struts 298 that extend about the periphery of the cage 296.

The abrasive rollers 42 are arranged generally in a circle defining an elongate and generally cylindrical food product receiving chamber 76 between them. The auger 78 is received in the chamber 76 and rotates during operation to urge food product 41 received in the chamber 76 from the inlet end 60 toward the outlet end 64. As is shown in FIG. 14, the auger drive motor 88 is coupled to the auger shaft 84 by a generally right angled gear reducer 300.

At the inlet end 60 of a preferred embodiment of the machine 40' shown in FIG. 14, the inlet end plate 120 has an axially outwardly extending flange 302 that defines a journal that bears against bearing rollers 304 carried by radially inwardly extending cage supporting arms 306 that are secured to or carried by the frame 54. The frame 54 remains stationary during operation. At the outlet end 64, adjacent the periphery of the outlet end plate 120 are a plurality of axially outwardly extending bearing rollers 308 that each ride on the radially inner surface of an outturned flange 310 of a cage support ring 312 that is secured to or carried by the frame 54.

At the inlet end 60, the inlet 62 comprises a stationary inlet chute 314 that funnels food product 41 that is to be processed into a rotating inlet chute 316 carried by the cage 296 which guides the product 41 into the chamber 76 where it is abraded by the rotating rollers 42 to clean the product 41 or clean and peel the product 41. Secured to and generally encircling the rotating inlet chute 316 is a generally cylindrical hub 318 that carries a sheave or pulley 320 which receives an endless flexible member 322 that is coupled to a pulley 324 on an output shaft 326 of another electric motor 328 for rotating the cage 296 about a longitudinal axis generally defined by the auger shaft 84.

The cage drive motor 328 is carried by or secured to the frame 54 of the peeling and cleaning machine 40'. The endless flexible member 322 preferably is a belt such as a cog belt or the like, but can be a chain, wire rope or another type of endless flexible member capable of transmitting rotary mechanical motion from the electric cage drive motor 328 to the cage 296 to rotate the cage 296.

Referring to FIGS. 15, 16, 18 and 19, the cage 296 can also be rotatively secured to the frame 54 at each end by a bearing ring assembly 330 that has one ring 332 secured to the frame 54 and the other ring 334 secured to an end plate with a plurality of ball or roller bearings 336 captured between the rings 332 and 334 which preferably interlock with each other. Preferably, the outer ring 334 is secured by one or more fasteners to an inwardly extending mount 338 of the frame 54 on each side of the machine 40'. Preferably, the inner ring 332 of the cage bearing ring assembly 330 is secured by a plurality of fasteners or the like to an end plate. Each end plate 118 and 120 preferably is rotatively secured to the frame 54 of the machine 40' by such a cage bearing ring assembly 330.

Preferably, the inlet end plate 120 to which the abrasive roller motors 44 are mounted can include a motor mounting plate 154 spaced axially from the end plate 120. If a motor mounting plate 154 is used, the motors 44 can be mounted to the plate 154 and the rollers 42 rotatively mounted to the end plate 120, such as in the manner depicted in FIG. 6. If desired, the motor 44 and roll bearing assembly 104 can both be mounted to the end plate 120. Other motor and abrasive roller mounting methods and mechanism are contemplated.

Figure 17:
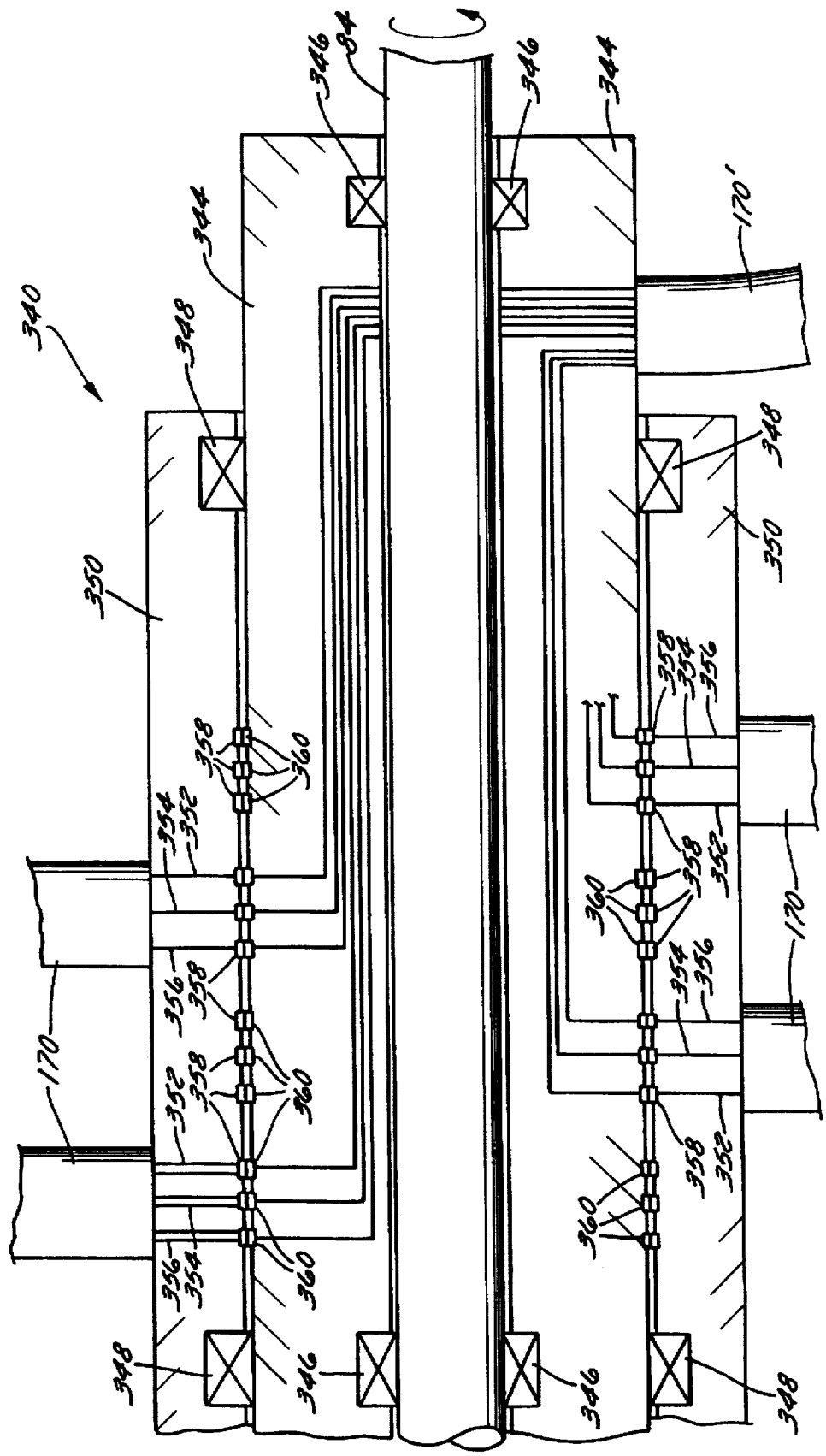
FIG. 17 is a fragmentary cross sectional view of an armature for distributing electrical power from the control unit to each of the drive motors while the cage and motors are rotating.

Referring to FIGS. 14, 15 and 17, electrical power is transferred from the stationary motor control system 166" to each of the abrasive roller drive motors 44 via a slip ring or commutator ring 340 that is constructed and arranged to distribute power to each motor 44 to rotate each roller 42 while the cage 296 is also rotating during operation. Preferably, the commutator ring 340 is rotatively carried by the auger shaft 84 such that it allows the auger shaft 84 to rotate independently of the cage 296 and ring 340 while still being able to transfer electrical power from the motor control system 166" and distribute the power to each motor 44. The ring 340 is shown in FIG. 15 secured to inlet end plate 120 by spokes 342.

Referring to FIG. 17, an exemplary commutator ring 340 is shown. The ring 340 has an inner core 344 rotatively supported on the auger shaft 84 by bearings 346 to permit relative rotation therebetween. Rotatively supported on the inner core 344 by bearings 348 is an outer core 350 which has an electric lead 170' connected to the motor control system 166". Leads 170 from each motor 44 are connected to the outer core 350 with individual leads 352, 354 and 356 for three phase power transfer extending radially inwardly to a contact ring or brush 358 at the radially inward surface of the outer core 350 each of which engages an axially aligned contact ring or brush 360 carried on the periphery of the inner core 344. Each contact ring or brush 358 and 360 preferably extends circumferentially about the core it is mounted on for continuous power transfer substantially throughout each entire core revolution.

The commutator 340 shown in FIG. 17 is constructed and arranged for independently transferring three phase electrical power from the motor control system 166" to each abrasive roller motor 44 such that independent speed control of each abrasive roller drive motor relative to each other abrasive roller drive motor is possible. However, the commutator 340 can be modified from that shown in FIG. 17 such that only three or four power input lines can make up power input lead 170' and transfer power to each motor 44 such that all motors 44 are operated at the same speed during machine operation. Of course, the commutator ring 340 can be further modified from that shown in FIG. 17 so as to group the abrasive roller drive motors into two or three banks with the speed of each motor 44 in a bank being independently controlled of the speed of the motors in the other bank or banks.

Figure 18:
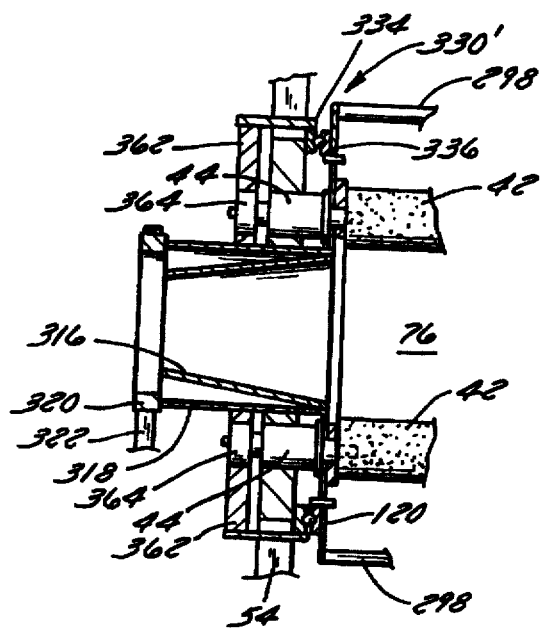
FIG. 18 is a fragmentary cross sectional view of one end of a rotating cage peeling and cleaning machine depicting a bearing ring for rotatively supporting one end of the cage.

Another electrical power transfer mechanism is shown in FIG. 18. In FIG. 18, a stationary outer power distribution ring 362 is attached to the frame 54 of the machine 40' and is in electrical communication with the control system 166". Each motor has a power transfer wheel 364 with electrical contacts that bear against contacts of the power distribution ring 362 when the cage 296 rotates during operation.

Referring once again to FIG. 15, to control the auger motor 88 if an auger 78 is used, the control panel 180' of the motor control system 166" preferably has an auger drive motor variable frequency drive 208 along with appropriate controls 188, 190, and 200 for controlling the startup and rotational speed of the auger 78 and its drive motor 88. To control each of the abrasive roller drive motors 44, the control panel 180' of the motor control system 166" preferably has at least one abrasive roller motor variable frequency drive 210 along with appropriate controls 186, 192 and 194 for controlling the startup and rotational speed of the abrasive roller motors 44.

Similarly, for controlling the speed of rotation of the cage 296, the cage drive motor 328 can be controlled by one of the aforementioned variable frequency motor drives 208 or 210 or can be controlled independently by its own variable frequency motor drive. If controlled by its own variable frequency drive, the control panel 180' preferably is equipped with a cage drive motor start switch 366, a cage drive motor stop switch 368, and a cage drive motor speed control 370. If desired, the control panel 180' can also be equipped with a cage speed indicator or display 372. If cage rotation is controlled by its own motor control 370, the auger speed and speed of the abrasive rollers 42 can be controlled and adjusted independently of each other and independently of the speed of rotation of the cage 296.

During operation, a peeling and cleaning machine 40 and 40' of the invention can be used to clean or clean and peel fruits and vegetables that can include, for example, potatoes, carrots, onions, radishes, beans, tomatoes, lettuce, apples, oranges, peaches, pears and other food products 41. A peeling and cleaning machine 40 and 40' of the invention can also be used to clean or otherwise abrasively engage non-edible things like plastic parts, metal components and the like.

During operation, product 41 is introduced into the chamber 76 through the inlet 62. When it reaches the chamber 76, the product 41 abrasively engages one or more of the rotating rollers 42 causing the abrasive action between the product 41 and a roller 42 to either clean, peel, or clean and peel the product 41. Relative rotation or relative movement between the product 41 and roller 42 helps to facilitate the abrasive action between the roller 42 and product 41. The speed of rotation can be increased or decreased simply by rotating the abrasive roller drive motor speed control 194.

To control how long the product remains in the chamber 76, auger rotation can be controlled. For example, residency time within the chamber 76 can be decreased by speeding the rotation of the auger 78 or can be increased by slowing the rotation of the auger 78. The auger 78 rotates relative to the frame 54 of the machine, can rotate relative to one or more of the rollers 42 and can be rotated in a direction that is opposite the direction of rotation of one or more of the rollers 42. The speed of rotation can be increased or decreased simply by rotating the auger drive motor speed control 200.

Where the machine is a rotating cage peeling and cleaning machine 40', the cage 296, composed of the rollers 42 and end plates 118 and 120, is rotated by the cage drive motor 328 about a longitudinal axis of the machine 40' preferably while each of the rollers 42 and the auger 78 are rotating. The speed of rotation of the cage 296 can be increased or decreased simply by rotating the cage drive motor speed control 370. In this manner, the amount of centrifugal force urging food product in the chamber 76 radially outwardly against the rollers 42 preferably can be controlled and adjusted for controlling and adjusting the processing of the product 41 within the chamber 76.

When the product 41 has traveled the length of the chamber 76 it is expelled from the machine 40 or 40' out the outlet 66.

It is understood that the invention is not confined to the particular construction and arrangement of parts herein illustrated and described, but embraces all such modified forms thereof as come within the scope of the following claims.

We claim:

1. An apparatus for abrasively engaging food product to clean or peel the food product comprising:

(a) a frame having an inlet end and an outlet end;
   (b) a plurality of elongate and generally cylindrical abrasive rollers with each roller journalled for rotation to the frame and extending from the inlet end to the outlet end with the rollers constructed and arranged to form a chamber for receiving food product therein;
   (c) an electric power supply;
   (d) an electric motor coupled to each abrasive roller and electrically connected to the power supply for driving an abrasive roller when electric power is supplied to the electric motor coupled to the roller.

2. The apparatus of claim 1 further comprising an electric motor drive in electrical communication with (1) the power supply and (2) each abrasive roller drive motor, with the electric motor drive constructed and arranged to control the output speed of each abrasive roller drive motor.

3. The apparatus of claim 2 wherein the electric power supply is a three phase alternating current power supply and the electric motor drive is a variable frequency electric motor drive capable of selectively varying abrasive roller motor speed.

4. The apparatus of claim 2 wherein there are at least four abrasive rollers with (1) at least one roller driven by an electric motor controlled by a first variable frequency drive and (2) at least one roller driven by an electric motor controlled by a second variable frequency drive such that the speed of at least one of the rollers can be controlled independently of the speed of another of the rollers.

5. The apparatus of claim 1 further comprising a gear reducer between each motor and abrasive roller with the gear reducer coupled to the roller and motor for rotating each roller at a speed less than the output speed of the electric motor.

6. The apparatus of claim 5 wherein for each abrasive roller the gear reducer and electric motor are generally axially in line with a longitudinal axis of the roller coupled to the gear reducer and motor.

7. The apparatus of claim 6 wherein the motor has an output shaft that is coupled to an input of the gear reducer and the gear reducer has an output shaft that is coupled to an input of the abrasive roller wherein the axis of rotation of the electric motor output shaft, gear reducer output shaft and abrasive roller are generally coaxial.

8. The apparatus of claim 1 wherein each electric motor is a gearmotor having an integral gear reducer with its output shaft coupled to an abrasive roller.

9. The apparatus of claim 5 wherein the gear reducer is a cycloidal gear reducer.

10. The apparatus of claim 9 wherein the motor has an output shaft that is coupled to the gear reducer and the gear reducer has an output shaft that is coupled to the abrasive roller wherein the axis of rotation of the electric motor output shaft, gear reducer output shaft, and abrasive roller are generally coaxial.

11. The apparatus of claim 1 wherein each of the abrasive rollers are generally horizontal forming an elongate product receiving chamber that is generally horizontal.

12. The apparatus of claim 1 further comprising (a) a rotatable auger having a generally helical flight for urging food product received in the food product receiving chamber toward the outlet end, (b) an electric motor coupled to the auger and connected to the electric power supply, and (c) an electric motor controller in electrical communication with the electric auger drive motor that is constructed and arranged to control the rotational speed of the auger drive motor thereby controlling the rotational speed of the auger.

13. The apparatus of claim 12 wherein the electric motor controller is an inverter or variable frequency drive.

14. The apparatus of claim 13 further comprising a variable frequency drive in electrical communication with at least one of the abrasive roller drive motors for controlling the rotational speed of at least one of the motors thereby controlling the rotational speed of at least one of the abrasive rollers.

15. The apparatus of claim 14 wherein all of the abrasive roller drive motors of the apparatus are controlled by a single variable frequency drive.

16. The apparatus of claim 1 wherein each abrasive roller comprises an elongate, generally cylindrical core having an abrasive exterior carried by the core with the core operably connected to a motor for being rotated by the motor so that the abrasive exterior engages food product in the chamber that contacts the abrasive exterior to at least slightly abrade the food product.

17. The apparatus of claim 16 wherein the food product is one of the following: potatoes, carrots, onions, beans, radishes, beans, tomatoes, lettuce, or another vegetable.

18. The apparatus of claim 17 wherein the abrasive action of one or more rotating abrasive rollers during engagement with a vegetable in the food product receiving chamber cleans the vegetable.

19. The apparatus of claim 17 wherein the abrasive action of one or more rotating abrasive rollers during engagement with a vegetable in the food product receiving chamber peels at least a portion of the vegetable.

20. The apparatus of claim 16 wherein the food product is one of the following: apples, oranges, peaches, pears or another fruit.

21. The apparatus of claim 16 wherein the abrasive exterior is a brush of generally cylindrical and elongate construction carried by the core for rotation in unison therewith.

22. The apparatus of claim 16 wherein the abrasive exterior is formed by a grit applied on the exterior of the core.

23. The apparatus of claim 1 wherein each of the abrasive roller drive motors is carried by the frame adjacent one of the end plates and is coupled to an abrasive roller for rotating the roller when electrical power is supplied to the motor.

24. The apparatus of claim 23 further comprising a motor mounting plate carried by the frame and which is located outwardly of an end plate with each motor mounted to the end plate.

25. The apparatus of claim 24 wherein an end of each abrasive roller is journalled to the end plate adjacent the motor mounting plate and coupled to the motor by a coupling shaft that extends from the motor between the motor mounting plate and the end plate adjacent the motor mounting plate to the abrasive roller.

26. The apparatus of claim 24 wherein each motor is a three phase alternating current electrical motor.

27. The apparatus of claim 1 wherein each motor is a three phase alternating current electrical motor.

28. The apparatus of claim 27 wherein each abrasive roller drive motor is capable of outputting to an abrasive roller at least as much as one-third horsepower.

29. The apparatus of claim 28 wherein each abrasive roller drive motor is at least a one-half horsepower motor.

30. The apparatus of claim 1 wherein both end plates are stationary and spaced apart with one end of each of the rollers journalled for rotation to one of the end plates and the other end of each of the rollers journalled for rotation to the other of the end plates with the rollers constructed and arranged to form a food product receiving chamber having an elongate generally upturned and semicircular cross section.

31. The apparatus of claim 30 wherein the apparatus is a stationary U-bed type food product peeling and cleaning apparatus.

32. The apparatus of claim 30 wherein the apparatus has at least four abrasive rollers and at least four abrasive roller drive motors.

33. The apparatus of claim 1 wherein both end plates are spaced apart and rotatively carried by the frame with one end of each of the rollers carried by and journalled for rotation to one of the end plates and the other end of each of the rollers carried by and journalled for rotation to the other of the end plates wherein the end plates and rollers forming a generally cylindrical cage defining a generally cylindrical food product receiving chamber and further comprising a drive constructed and arranged to rotate the cage about its longitudinal axis.

34. The apparatus of claim 33 wherein the rollers and end plates are constructed and arranged to form a cage having a generally horizontal axis of rotation.

35. The apparatus of claim 34 wherein each abrasive roller drive motor is carried by an end plate and coupled to an abrasive roller such that each of the motors and rollers rotate in unison about the longitudinal axis of the cage when the cage is rotated and further comprising a commutator operably associated with the cage for enabling power to be transferred from the power supply to each of the abrasiver roller drive motors to enable the motors to rotate each of the abrasive rollers independently of the cage.

36. The apparatus of claim 35 further comprising an auger having a shaft journalled for rotation to the frame adjacent one end of the food product receiving chamber, a helical flight carried by the shaft having a portion of the flight received in the chamber for urging food product toward the outlet end when rotated and an electric motor coupled to the auger shaft and connected to the power supply for rotating the auger when supplied with electric power.

37. The apparatus of claim 36 wherein the commutator is carried by the auger shaft.

38. The apparatus of claim 36 further comprising a variable frequency drive in electrical communication with the power supply and each abrasive roller drive motor for controlling the rotational speed of each abrasive roller by controlling the rotational speed of each abrasive roller drive motor.

39. The apparatus of claim 37 wherein the variable frequency drive controls the direction of rotation of each of the abrasive rollers by controlling the direction of rotation of each of the abrasive roller drive motors.

40. The apparatus of claim 38 further comprising a second variable frequency drive in electrical communication with the power supply and the auger drive motor for controlling the rotational speed of the auger by controlling the rotational speed of the auger drive motor.

41. The apparatus of claim 40 wherein the second variable frequency drive controls the direction of rotation of the auger by controlling the direction of rotation of the auger drive motor.

42. The apparatus of claim 38 wherein the cage drive comprises a three phase alternating current electric motor and further comprising a variable frequency electric motor drive in electrical communication with the power supply and electrically connected to the motor for controlling the rotational speed of the cage by controlling the rotational speed of the cage drive motor.

43. The apparatus of claim 34 wherein the frame is stationary and further comprising (a) a first bearing ring operably connected to the frame and one of the end plates and (b) a second bearing ring operably connected to the frame and the other of the end plates with each bearing ring constructed and arranged to enable the cage to rotate relative to the frame.

44. The apparatus of claim 43 wherein the bearing ring comprises a first ring mounted to the frame and a second ring mounted to an end plate with the rings interlocking each other and capturing a plurality of bearings between the rings permitting the first ring to rotate relative to the second ring while preventing separation of the rings from each other.

45. The apparatus of claim 33 wherein the rolls form a circle when rotatively mounted to the end plates.

46. A food processing apparatus for cleaning and peeling food product comprising:
(a) a stationary frame having an inlet end and an outlet end;
(b) a pair of spaced apart end plates carried by the frame;
(c) at least four abrasive rollers each having an axis of rotation with one end of each roller journalled for rotation to one of the end plates and the other end of each roller journalled for rotation to the other of the end plates and the rollers rotatively mounted to the end plates forming a generally upturned U-shaped chamber for receiving food product therein;
(d) an electric power supply;
(e) an electric motor coupled to one end of each abrasive roller for rotating each abrasive roller;
(f) a variable frequency electric motor drive connected to the power supply and to at least one of the abrasive roller drive motors for controlling operation of at least one of the motors to control the rotational speed of at least one of the abrasive rollers coupled to at least one of the motors.

47. The apparatus of claim 46 wherein the variable frequency electric motor drive is an inverter.

48. The apparatus of claim 46 wherein each motor has an output shaft that is operably coupled to an abrasive roller with the output shaft having an axis of rotation that is generally parallel to the axis of rotation of the abrasive roller.

49. The apparatus of claim 48 wherein the axis of rotation of the output shaft of each motor is substantially aligned with the axis of rotation of the abrasive roller operably coupled to the motor output shaft.

50. The apparatus of claim 48 further comprising a gear reducer operably coupled to the output shaft of the motor and the gear reducer having an output shaft that is operably coupled to an abrasive roller.

51. The apparatus of claim 50 wherein the output shaft of the gear reducer is generally coaxial with the axis of rotation of the abrasive roller mounted to the gear reducer output shaft.

52. The apparatus of claim 51 wherein the motor has a housing with a generally flat face from which outwardly extends its output shaft and to which the gear reducer is mounted and wherein the gear reducer is operably attached to an end plate of the frame.

53. The apparatus of claim 52 further comprising a motor mounting plate carried by the frame and spaced outwardly from an end plate and wherein the gear reducer is mounted to the motor mounting plate and has its output shaft coupled to an abrasive roller that is journalled to the adjacent end plate.

54. The apparatus of claim 46 wherein each motor is immovably mounted to an end plate adjacent an abrasive roller.

55. The apparatus of claim 54 wherein each motor is mounted to a motor mounting plate carried by and spaced outwardly from the end plate.

56. The apparatus of claim 46 further comprising (a) an auger having a shaft journalled for rotation to the frame and a generally helical flight carried on the shaft which extends into the food product receiving chamber for urging food product received in the chamber toward the outlet end, (b) an electric motor immovably carried by the frame and mounted to one end of the auger shaft for rotating the shaft; and (c) an electric motor drive electrically connected to the power supply and to the auger drive motor for controlling operation of the auger drive motor.

57. The apparatus of claim 56 wherein the electric motor drive for controlling operation of the auger drive is a variable frequency drive capable of controlling the rotational speed of the auger by controlling the rotational speed of the auger drive motor.

58. The apparatus of claim 56 wherein the electric motor drive is an inverter.

59. The apparatus of claim 46 wherein all of the auger drive motors are mounted to or carried by the same end plate.

60. A food processing apparatus for cleaning and peeling food product comprising:
(a) a frame having an inlet end and an outlet end;
(b) a pair of spaced apart end plates carried by the frame;
(c) at least four abrasive rollers each having an axis of rotation with one end of each roller journalled for rotation to one of the end plates and the other end of each roller journalled for rotation to the other of the end plates and rotatively mounted to the end plates with at least a portion of the rollers forming a generally semicircular chamber for receiving food product therein;
(d) an electric power supply; and
(e) an electric motor electrically connected to the power supply and coupled to one end of each abrasive roller for rotating each abrasive roller such that the output shaft of each motor is generally coaxial with the axis of rotation of the abrasive roller coupled to the motor.

61. A food processing apparatus for cleaning and peeling food product comprising:
(a) a frame having an inlet end and an outlet end;
(b) a pair of spaced apart end plates carried by the frame;
(c) at least four abrasive rollers each having an axis of rotation with one end of each roller journalled for rotation to one of the end plates and the other end of each roller journalled for rotation to the other of the end plates and the abrasive rollers rotatively mounted to the end plates with at least a portion of the rollers forming a generally semicircular chamber having an inlet for admitting food product into the chamber and an outlet for expelling food product out of the chamber;
(d) an electric power supply; and
(e) an electric motor for each abrasive roller that is electrically connected to the power supply with each motor having an output shaft and the output shaft having an axis of rotation; and
(f) a cycloidal gear reducer coupled to the output shaft of each abrasive roller drive motor and having the output shaft of each gear reducer coupled to an abrasive roller with the axis of rotation of the gear reducer output shaft generally coaxial with the axis of rotation of the abrasive roller coupled to the gear reducer output shaft.

62. The apparatus of claim 61 wherein the output shaft of each motor has an axis of rotation that is generally coaxial with the axis of rotation of the gear reducer output shaft and the abrasive roller coupled to the gear reducer output shaft.

63. The apparatus of claim 61 wherein each motor and gear reducer is carried by an end plate adjacent the abrasive rollers.

64. The apparatus of claim 61 wherein the gear reducer output shaft rotates a speed slower than the output shaft of the electric motor coupled to the gear reducer.

65. A method of peeling and cleaning fruits and vegetables comprising the steps of:
  (a) providing a stationary frame having a pair of end plates, a plurality of elongate and generally cylindrical abrasive rollers journalled for rotation at each end to an end plate, a gear reducer having an output shaft coupled to each abrasive roller, an electric motor having an output shaft coupled to each gear reducer, and an electric power supply for providing electric power to operate each motor;
  (b) applying electrical power to each motor;
  (c) reducing the output speed of the motor output shaft; and
  (d) rotating each abrasive roller.

66. The apparatus of claim 1 wherein there are as many electric motors as abrasive rollers such that there is a separate electric motor coupled to each abrasive roller.

67. The apparatus of claim 66 wherein the apparatus has the same number of electric motors as the number of abrasive rollers.

68. The apparatus of claim 33 wherein there are as many electric motors as abrasive rollers such that there is a separate electric motor coupled to each abrasive roller.

69. The apparatus of claim 68 wherein the apparatus has the same number of electric motors as the number of abrasive rollers.

70. The apparatus of claim 46 wherein there are as many electric motors as abrasive rollers such that there is a separate electric motor coupled to each abrasive roller.

71. The apparatus of claim 70 wherein the apparatus has the same number of electric motors as the number of abrasive rollers.

72. The apparatus of claim 61 wherein there are as many electric motors as abrasive rollers such that there is a separate electric motor coupled to each abrasive roller.

73. The apparatus of claim 72 wherein the apparatus has the same number of electric motors as the number of abrasive rollers.

* * * * *